United States Patent
Ortner

(10) Patent No.: US 9,871,411 B2
(45) Date of Patent: Jan. 16, 2018

(54) HVAC HOME GENERATOR

(71) Applicant: Charles R Ortner, Harvest, AL (US)

(72) Inventor: Charles R Ortner, Harvest, AL (US)

( * ) Notice: Subject to any disclaimer, the term of this patent is extended or adjusted under 35 U.S.C. 154(b) by 254 days.

(21) Appl. No.: 14/852,731

(22) Filed: Sep. 14, 2015

(65) Prior Publication Data

US 2016/0087435 A1 Mar. 24, 2016

Related U.S. Application Data

(60) Provisional application No. 62/071,251, filed on Sep. 19, 2014.

(51) Int. Cl.
*H02J 3/00* (2006.01)
*H02J 9/06* (2006.01)

(52) U.S. Cl.
CPC .................... *H02J 9/066* (2013.01)

(58) Field of Classification Search
CPC .. H02J 9/066; H02J 3/00; H02J 7/0052; H02J 9/06
USPC .......................................................... 307/23
See application file for complete search history.

(56) References Cited

U.S. PATENT DOCUMENTS

| | | | |
|---|---|---|---|
| 2,002,312 A | 7/1932 | Dail | |
| 4,528,966 A | 7/1985 | Lent et al. | |
| 4,962,749 A | 10/1990 | Dempsey et al. | |
| 5,844,328 A | 12/1998 | Furst | |
| 6,441,505 B1 | 8/2002 | Poletti et al. | |
| D516,507 S | 3/2006 | Nushart et al. | |
| 7,245,032 B2 | 7/2007 | Willets et al. | |
| 8,222,548 B2 | 7/2012 | Espeut, Jr. | |
| 8,616,159 B1 | 12/2013 | Hawkins | |
| 2004/0150374 A1* | 8/2004 | Kraus | H02J 9/066 322/4 |
| 2006/0055193 A1* | 3/2006 | Colborne | B60P 3/14 296/24.3 |
| 2006/0066108 A1 | 3/2006 | Willets et al. | |
| 2007/0052294 A1* | 3/2007 | Kraus | H02J 9/066 307/65 |
| 2008/0251593 A1 | 10/2008 | Brandt | |
| 2009/0096426 A1 | 4/2009 | Schaper et al. | |
| 2009/0229288 A1 | 9/2009 | Alston et al. | |
| 2010/0009724 A1* | 1/2010 | Fischer | H02J 1/10 455/573 |
| 2012/0187764 A1 | 7/2012 | Rockenfeller et al. | |
| 2012/0255302 A1 | 10/2012 | Hugelman et al. | |

(Continued)

*Primary Examiner* — Danny Nguyen
*Assistant Examiner* — Brian K Baxter
(74) *Attorney, Agent, or Firm* — Cynthia R. Wright

(57) ABSTRACT

A natural gas or liquified propane powered generator incorporated into a HVAC unit, for supplying emergency power to a residence or commercial business. The generator is contained within an exterior cabinet that houses HVAC components for both packaged and split systems. The packaged unit is arranged so that the generator is included within the exterior cabinet and the split unit is arranged so that the generator is positioned beneath the split unit. The generator operates from natural gas or liquified propane supplied to the home or from a portable liquified propane tank, if the supply of natural gas or liquified propane is terminated. In the event of a power failure, the user manually operates the generator or an automatic transfer switch can be utilized. On-site electronics are included to allow a user to monitor the system from a smart phone or other electronic device.

19 Claims, 16 Drawing Sheets

(56) References Cited

U.S. PATENT DOCUMENTS

| | | |
|---|---|---|
| 2012/0282561 A1 | 11/2012 | Kaiser |
| 2014/0069618 A1 | 3/2014 | Hamm et al. |
| 2014/0090411 A1 | 4/2014 | Hu et al. |
| 2014/0214213 A1 | 7/2014 | Rockenfeller et al. |
| 2014/0220957 A1* | 8/2014 | Fischer .................... H02J 1/10 455/418 |
| 2015/0171662 A1* | 6/2015 | Lathrop ................. H02J 9/066 307/64 |
| 2016/0316430 A1* | 10/2016 | Fischer .................... H02J 1/10 |

* cited by examiner

HVAC HOME GENERATOR

CROSS-REFERENCE TO RELATED APPLICATIONS

This application claims the benefit of the priority to provisional application No. 62/071,251 filed with the United States Patent and Trademark Office on Sep. 19, 2014 entitled "3N1 cool air; heat; electric power", the disclosure of which is incorporated herein by reference as if fully set forth herein. Further, this application claim the benefit of the PCT application number PCT/US 15/49776 filed with the United States Patent and Trademark Office on Sep. 11, 2015 entitled "HVAC Home Generator", the disclosure of which is incorporated herein by reference as if fully set forth herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR JOINT INVENTOR

The inventor did not disclosed the invention herein prior to the 12 month period preceding the filing of his provisional application.

BACKGROUND OF THE INVENTION (1) Field of the Invention

The present invention relates to an apparatus and method of temporarily powering a personal residence or commercial building using a generator that is built into the heating and air conditioning unit. The built-in generator runs on the natural gas or liquified propane that is used to power the heating function of the heating and air conditioning unit. The user will have heating, cooling, and electrical power throughout their home during extended periods of time, including during power outages, with the push of a button.

(2) Description of Related Art

In recent years, numerous storms, including hurricanes Sandy and Katrina, have taken out portions of the electrical grid resulting in extended electrical outages. Although storms frequently cause electrical outages, natural gas lines are usually unaffected. Additionally, many people experiencing electrical power outages have access to propane, which is cheap and readily available at most convenience stores. There is a significant need for a method and apparatus to utilize natural gas and propane to power homes and commercial buildings during times that electrical power is unavailable. Additionally, natural gas and LP are currently significantly cheaper sources of power than electrical energy. Electrical power is typically generated from burning coal. Natural gas and LP are cleaner to burn than coal producing lower levels of carbon emission. A method and system that allows the use of natural gas and/or LP to power the electrical needs of a home or commercial building will save consumers money and will reduce carbon emissions into the environment.

Currently, gas generators are readily available at many home improvement stores and sporting good stores. A gas generator allows a user to power electrical devices when electrical power is disrupted. Although gas generators may be used during electrical power outages to power a portion of a residence's needs, they have numerous disadvantages. In order to start and maintain a gas generator, a user must have access to large quantities of gasoline because gas generators are highly inefficient burning copious amounts of gasoline while providing little electrical power. Anyone relying on a gas generator must keep a large supply of gasoline "on hand" because gasoline stations, which are likely to be suffering from the same electrical power outage, will be unable to pump and sell gasoline when their pumps are shut down due to a lack of electrical power. Gasoline utilized in the generator must be "fresh" or purchased recently because additives in gasoline breakdown overtime and will gum up the generator preventing it from starting. Additionally, over time water condenses within the gasoline storage container contaminating the gasoline and preventing the generator from starting or causing it to gum up and stop once started. Portable generators operating on natural gas and liquid propane ("LP") are ineffective at powering a home or commercial building because of improper installation of the generator, installing a generator that is too small to power basic needs of the home or commercial building, and problems with proper ventilation of exhaust fumes. Gas, diesel, natural gas, and LP generators must be placed in an open area to protect users from exhaust fumes which can be lethal. Gas-powered generators create a lot of noise. A typical neighbor experiences a sound pressure level of 35 dBA at night and 45 dBA during the daytime. A diesel-powered gas generator can generate from 110 to 115 dB per picowatt of energy produced. Gas generators produce enough noise pollution to readily disturb neighbors even during daylight hours. There is a need for an apparatus or method that allows a natural gas or LP generator to power the electrical needs of a residence or commercial building that is easy to install and operate, does not expose humans or animals to harmful exhaust, and lacks the loud operating noises common to commercially available generators.

A number of electrical generating devices has been disclosed in the prior art. Several devices have been disclosed that provide backup electrical power to energize heating, ventilation, and air conditioning ("HVAC") systems. Brandt (US 2008/0251593 A1) discloses coupling a natural gas or propane line to a generator so that boiler would continue to pump hot water through a home, heating said home, until electric power is restored to the home. The Brandt invention either vents the generator through the chimney of the home or mounts the generator outside of the home. The device of Brandt only powers the boiler or other home heating device. Kaiser (US 2012/0282561 A1) discloses a method of installing and using a backup electrical generator so that the backup generator and the heating apparatus are positioned proximate to each other and they both share a common exhaust flue. The device of Kaiser provides an apparatus and method of generating electrical power via the fuel input of the heating apparatus so that the electrical power generated operates the heating apparatus when the electrical generator is powered on. But, the device of Kaiser is not suitable to power the electrical needs of the building. Gravestock (EP 2 787 301 A1) discloses a power generating system wherein an electrical generator is tied into the gas-powered supply line that supplies the heating system. Activation of the electrical generator can be automatic or manual when the flow of electrical power into the heating system drops below a certain threshold. None of these devices offers an apparatus or method of providing electrical power to the home or commercial building.

Furst (U.S. Pat. No. 5,844,328) discloses a backup power system for electrical appliances. The backup system includes an electric battery utilizing a DC current with a charging circuit to connect to a charging mechanism, a circuit to connect the battery to the appliance, and a converter for converting DC current from the backup battery to AC current for the appliance. The device of Furst lacks sufficient battery capacity to power the electrical needs of a home or commercial building.

Other devices have been disclosed that seek to power the electrical needs of a home or commercial building. Hawkins (U.S. Pat. No. 8,616,159 B1) discloses a wheeled, manually movable, internal combustion engine powered electric generator mounted in a rigid frame formed of tubular steel elements. The electricity generating components of the device mount to the bottom of the steel frame, the internal combustion engine mounts toward the rear end of the frame, and a propane tank mounts above the engine proximate to a battery charger. While this device may power the temporary electrical needs of a home or building during a power outage, the size of the propane tank limits the length of time this device could power a building. Additionally, because the device is not covered or protected from the elements, it could not be maintained and stored outside in environmental conditions. This device would need to be positioned in an outside area and connected to the electric load upon a power outage. Although this device would be easy to service once connected to the electrical load, difficulties in positioning and connecting the device hamper its usage. And, this device does not address noise issues relating to electrical generators. Poletti et al. (U.S. Pat. No. 6,441,505 B1) discloses a backup generator positioned on a multi-level cabinet proximate to a fuel tank. The invention of Poletti is designed to provide backup power to electronic devices, such as a personal communications system ("PCS") site. The device of Poletti et al. includes a cabinet enclosing the electronics protecting them from environmental conditions. The backup generator is wired into the power line servicing the PCS and detects when a power failure has occurred. The backup generator provides power to the PCS when the power is out and deactivates when power is restored to the power line servicing the PCS. Although this device is able to power the PCS for multiple days, it would be unable to power the needs of a residence or commercial building. Additionally, this device is useful in remote areas and would not be suitable in a residential neighbor where noise levels are regulated.

Currently, many home builders and electrics may wire a three-prong outlet from the breaker box to allow a user to plug in a generator to power a home. Many breaker boxes are installed in an interior areas of a home, for example in a basement beneath an interior stairwell. Installing a generator through an electrical outlet stemming from a breaker box requires that the generator to be installed very near the breaker box so that the cord of the generator can reach the outlet. This may be difficult to impossible to do in certain situations. Additionally, this configuration requires a fuel source that must be vented outside the home into a safe area, which may not be possible to perform within the close proximity of the breaker box.

A number of inventions have been disclosed that include an automatic transfer switch to disconnect power from the main entering a residence and feed power generator power to certain selected fuses within the breaker box. Donald B. Espeut, Jr. (U.S. Pat. No. 8,222,548 B2) discloses a mechanical automatic transfer switch that is able to manually manipulate both the main breaker and the auxiliary generator breaker so that the generator is powered up only after the main breaker is placed in an "off" position. The Espeut device does not allow for the charging of a battery to initiate the start of the generator because power is not provided to the generator unless the main breaker is in an "off" position. Also, the invention of Espeut only powers certain enumerated outlets within a residence. If a desired outlet has not been previously routed from the device to the auxiliary generator, power can not be directed to the outlet. Devices with automatic transfer switches are typically expensive and their installation and maintenance is expensive as well.

There exists a need for a backup electrical generator that is permanently affixed to the home or commercial building to be serviced, said generator must be able to provide electrical power to the home or commercial building for an extended period of time in case of a power outage lasting for a week or more, said generator must be in compliance with local noise regulations, said generator must be protected from environmental conditions, and said generator must be safely vented so that exposure to harmful exhaust is minimized or eliminated. Said generator should be able to power any desired outlet of the residence or commercial building. Said generator should be relatively inexpensive to purchase, install, and maintain. Having a generator incorporated with the heating, ventilation, and air conditioning system of a home reduces the costs of purchasing, installing, and maintaining said auxiliary power.

DETAILED DESCRIPTION OF THE INVENTION

Figure 1:
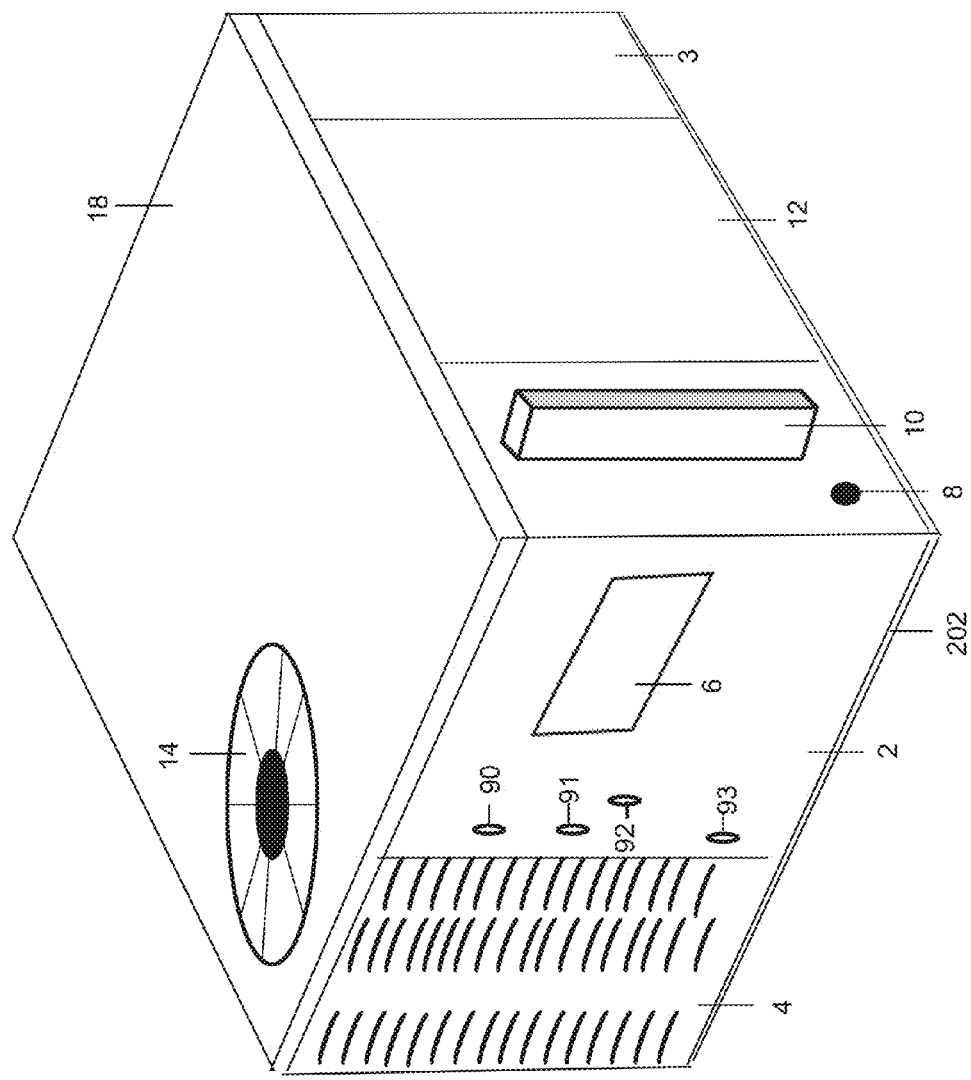
FIG. 1 is an angled view showing the top, front cabinet panel, and right cabinet panel of the packaged unit embodiment of the HVAC Home Generator.

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, et., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a ter; the scope and meaning of a term is the same, in the same context, whether or not it is highlighted. It will be appreciated that the same thing can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified ter. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

The present invention is directed to generator that is incorporated into the heating, ventilation, and air conditional ("HVAC") system of a "home" or "residence". In the present disclosure, "home" and "residence" are to be understood to have an expanded meaning to encompass any residence, business or governmental facility or other structure (e.g., a church, law office, etc.). The generator provides auxiliary power to the home during an emergency or during other desired situations.

Figure 11:
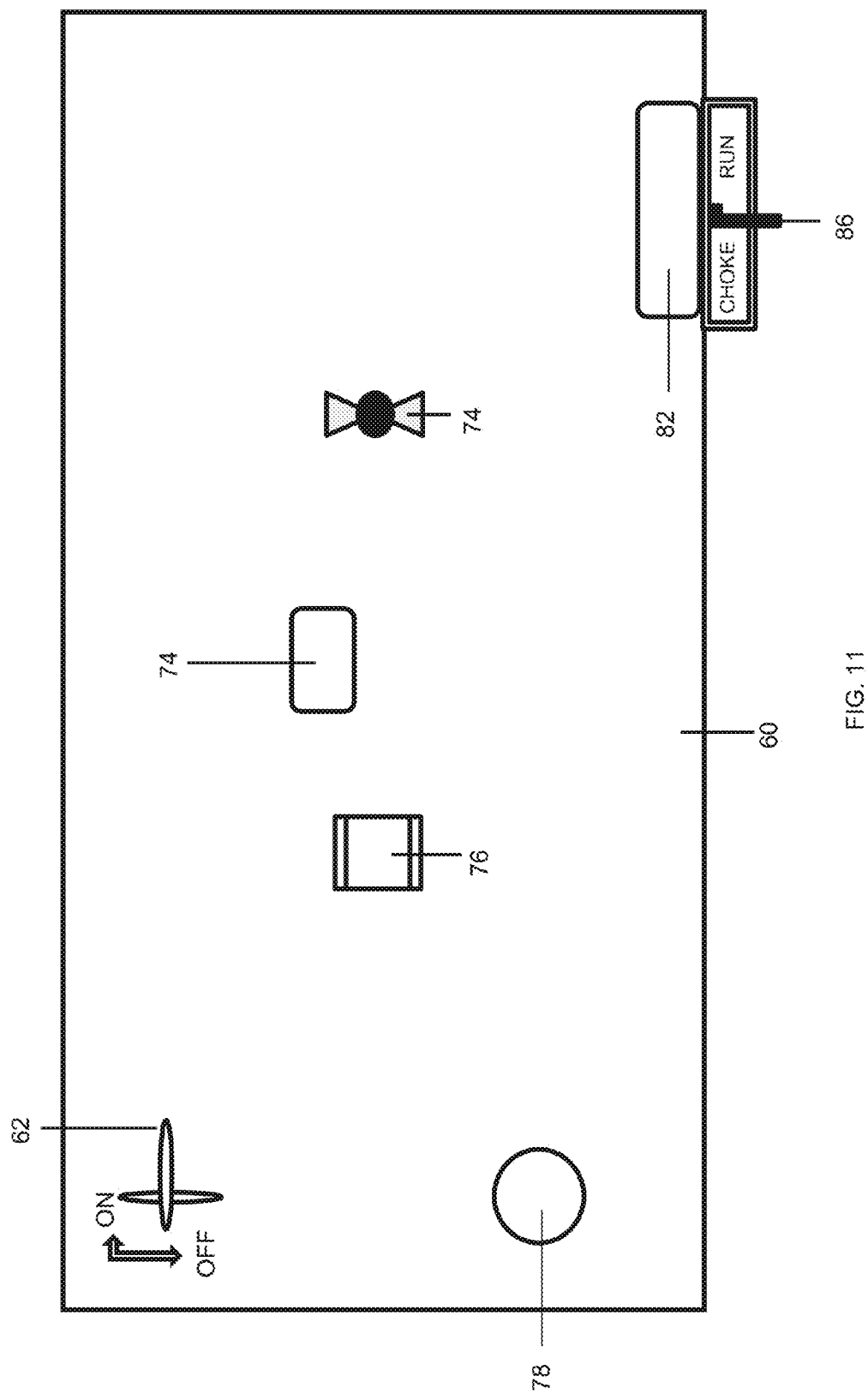
FIG. 11 illustrates a front view of the generator control panel of the HVAC Home Generator.
Figure 12:
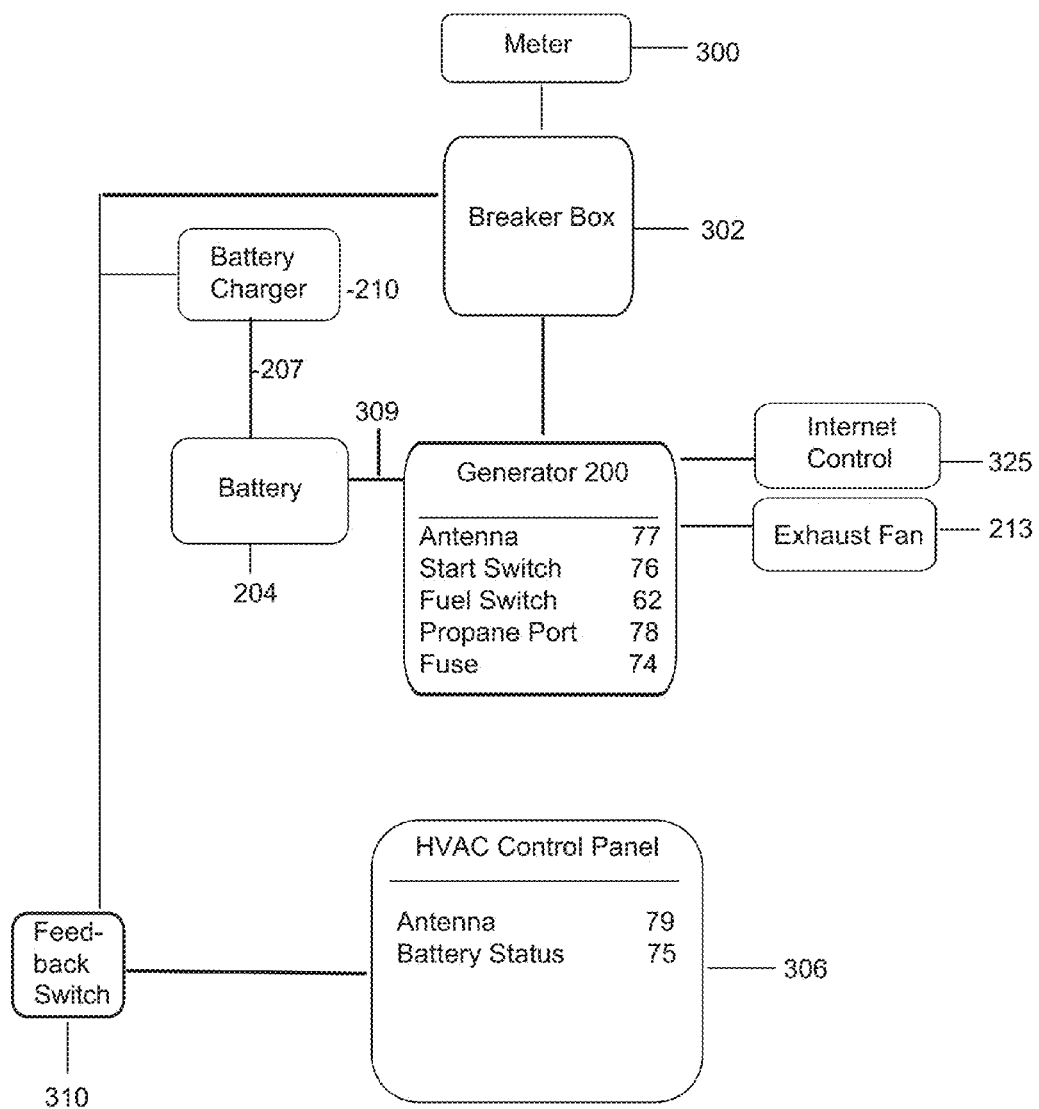
FIG. 12 is a flow chart depicting the electrical configuration of the components of the HVAC Home Generator.

The HVAC Home Generator comprises the combination of an air conditioning unit to cool the home, a heating unit to warm the home, and a generator unit to provide power to the home during periods that electrical service to the home is interrupted or as desired. This all-in-one device saves space by integrating a home generator into the exterior HVAC cabinet of the home or commercial building. The HVAC Home Generator may be utilized in both packaged and split units. A package unit is single unit that houses both the heating and air conditioning systems. In a split system, the heating unit is separated from the air conditioning unit with the air conditioning unit typically being located outside the home or commercial building and the heating unit being located in a basement, crawl space, attic, or other interior location within the home or commercial building. In the packaged unit embodiment, the generator member is housed within the air conditioning and heating packaged unit so that the generator is contiguous with both the air conditioning and heating units. FIGS. 1-9 illustrate the HVAC Home Generator incorporated into a packaged unit. In the split unit embodiment of the HVAC Home Generator, the generator unit is housed beneath the air conditioning unit, which is located outside the home or commercial building. FIGS. 13A-17C illustrate the split system embodiment of the HVAC Home Generator. The combination of the generator unit with the HVAC is a cheaper alternative to the purchase and installation of a separate generator unit. FIG. 11 shows the electrical connections between the different components of the HVAC Home Generator, and FIG. 12 depicts a method of connecting the present invention to the home breaker box.

Embodiments of the present invention may include one or more of the following features.

The HVAC Home Generator may be a single-piece heating and cooling unit that is fully factory assembled and commercially sold pre-tested. The HVAC Home Generator may also be retrofitted into an existing HVAC unit. FIG. 1 is an angled view of the packaged unit showing both the top 18, front 2, and right 3 side cabinet panels of the cabinet. The cabinet includes the exterior top, bottom, and side cabinet panels as well as the base panel that comprise the outer cabinet panels and floor of the unit. The outer cabinet panels may be composed of galvanized steel, bonderized and coated with a pre-painted baked enamel finish on all externally exposed surfaces. Internal surfaces of the outer cabinet panels may have a primer coated finish. All interior surfaces of the cabinet may be insulated with a minimum ½ inch, 1 lb density foil-faced cleanable insulation. Insulation is bonded with a thermosetting resin (8 to 12% by weight nominal, phenol formaldehyde typical) material that meets or exceeds the National Fire Protection Association 90 flame retardance requirements and has a "R" value of 3.70 as a minimum. The top 18, front 2, right 3, left 34 (shown in FIG. 3), and rear 7 (shown in FIG. 2) cabinet panels may be attached to an inner steel or composite frame via non-corrosive sheet metal screws. Large area access cabinet panels including the outer top cabinet panel 18, front 2, right 3, left 34 (shown in FIG. 3), and rear 7 (shown in FIG. 2) cabinet panels have larger non-corrosive screws. Outer top cabinet panel 18, front 2, right 3, left 34 (shown in FIG. 3), rear 7 (shown in FIG. 2), and base 202 cabinet panels enclose and protect the HVAC Home Generator generator unit from environmental conditions that could damage the generator. Each large cabinet panel, including but not limited to outer top cabinet panel 18, front 2, right 3, left 34 (shown in FIG. 3) rear 7 (shown in FIG. 2), are double-wall constructed.

Top cabinet panel 18 may include fan 14 which allows air to access the condenser. Fan 14 may be a direct-driven propeller type fan with corrosion-resistant aluminum blades riveted to corrosion-resistant steel supports. Fan 14 blades are dynamically balanced and discharge air upwards. The condenser and fan 14 motor may be totally enclosed within the cabinet, which thermally protects them from environmental conditions. The compressor (not shown) may be fully hermetic, scroll type with an on-demand crankcase heater and factory mounted on rubber grommets and internally spring mounted for vibration isolation.

Front cabinet panel 2 may include combustion air inlet hood 6, manual reset high pressure control 90, field wiring entrance 91, field thermostat wiring entrance 92, and condensate drain 93. Manual reset high pressure control 90, field wiring entrance 91, field thermostat wiring entrance 92, and condensate drain 93 allow the unit to be serviced by a qualified technician. Front cabinet panel 2 may include a combustion air inlet hood 6 to allow air to enter the HVAC device. Outdoor coil protective grill 4 is louvered to allow air to be pulled from the outside of the device. This air is routed through the device and out exhaust outlet hood 10. Condenser 14 powers this movement of air through the air conditioning and heating members of the device. Outer right cabinet panel 3 surrounds the right side of the unit and may include gas supply entrance 8 that allows natural gas or liquid petroleum to enter the generator unit 200 (shown in FIG. 4), exhaust outlet hood 10 allows air utilized by the HVAC components of the device to be exhausted out of the device and into the exterior environment. Blower access cabinet panel 12 can be removed to service the HVAC blower. Return air filters may be accessible through a dedicated, hinged access panel located within the home or commercial building.

The HVAC Home Generator may have standard through-the-bottom power and control wiring connection capability or the electrical wiring may enter the cabinet at a location on the side of the cabinet.

Figure 2:
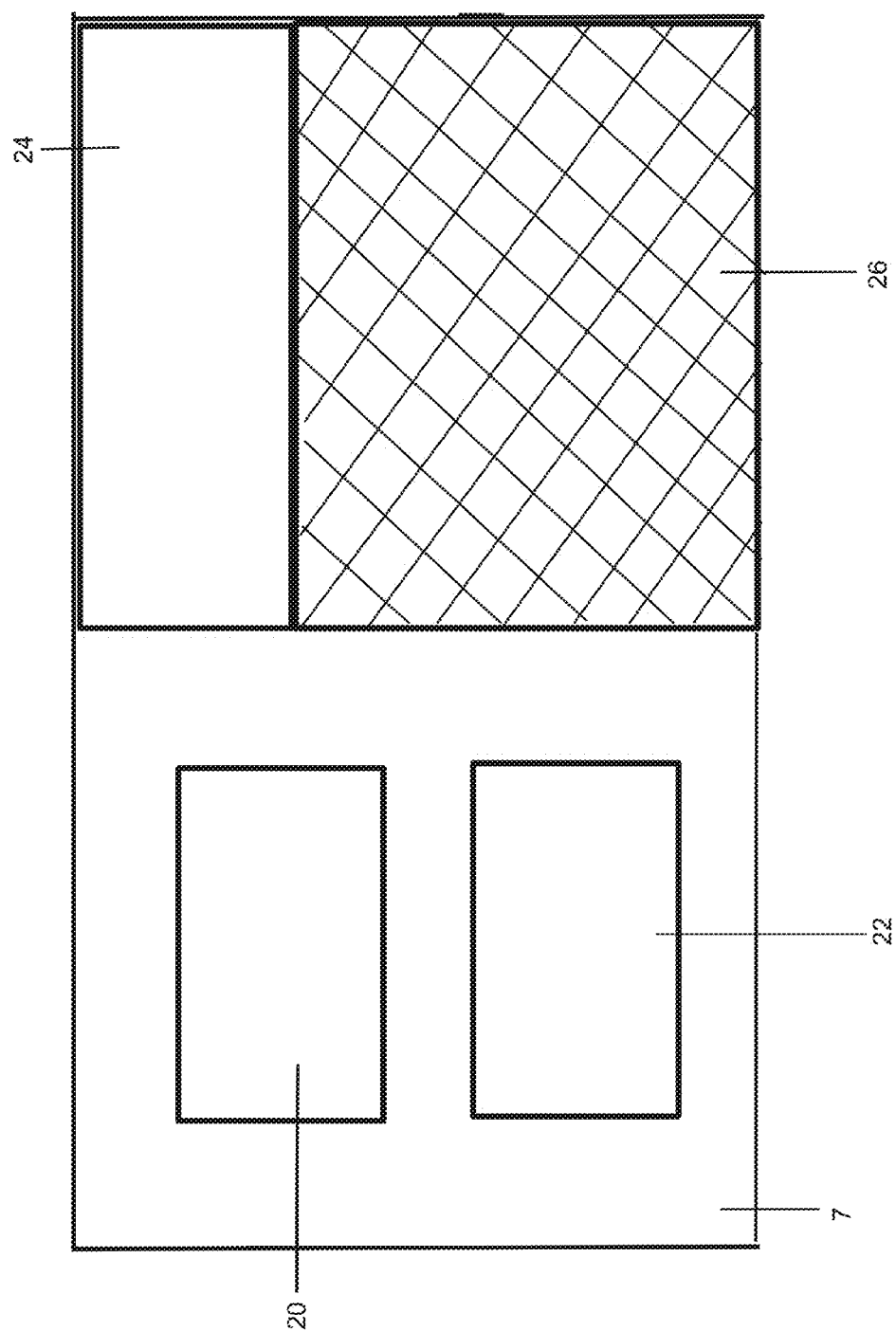
FIG. 2 depicts the rear cabinet panel of the packaged unit embodiment of the HVAC Home Generator.

FIG. 2 depicts the outer rear cabinet panel 7 of the device. Outer rear cabinet panel 7 runs parallel to the exterior wall of the home. Outer rear cabinet panel 7 may include a rectangular upper cut out 20 that may house the return duct and lower cut out 22 that may house the supply duct leading to the HVAC packaged unit. Generator hard cabinet panel 24 may allow a user access to control components of the HVAC package unit. Generator grid panel 26 allows air to flow into the generator. Although the duct running from upper cut out 20 and lower cut out 22 to the residence or commercial building is typically uninsulated, said duct is insulated in the HVAC Home Generator in order to reduce noise emitted while generator 200 is operating.

Figure 3:
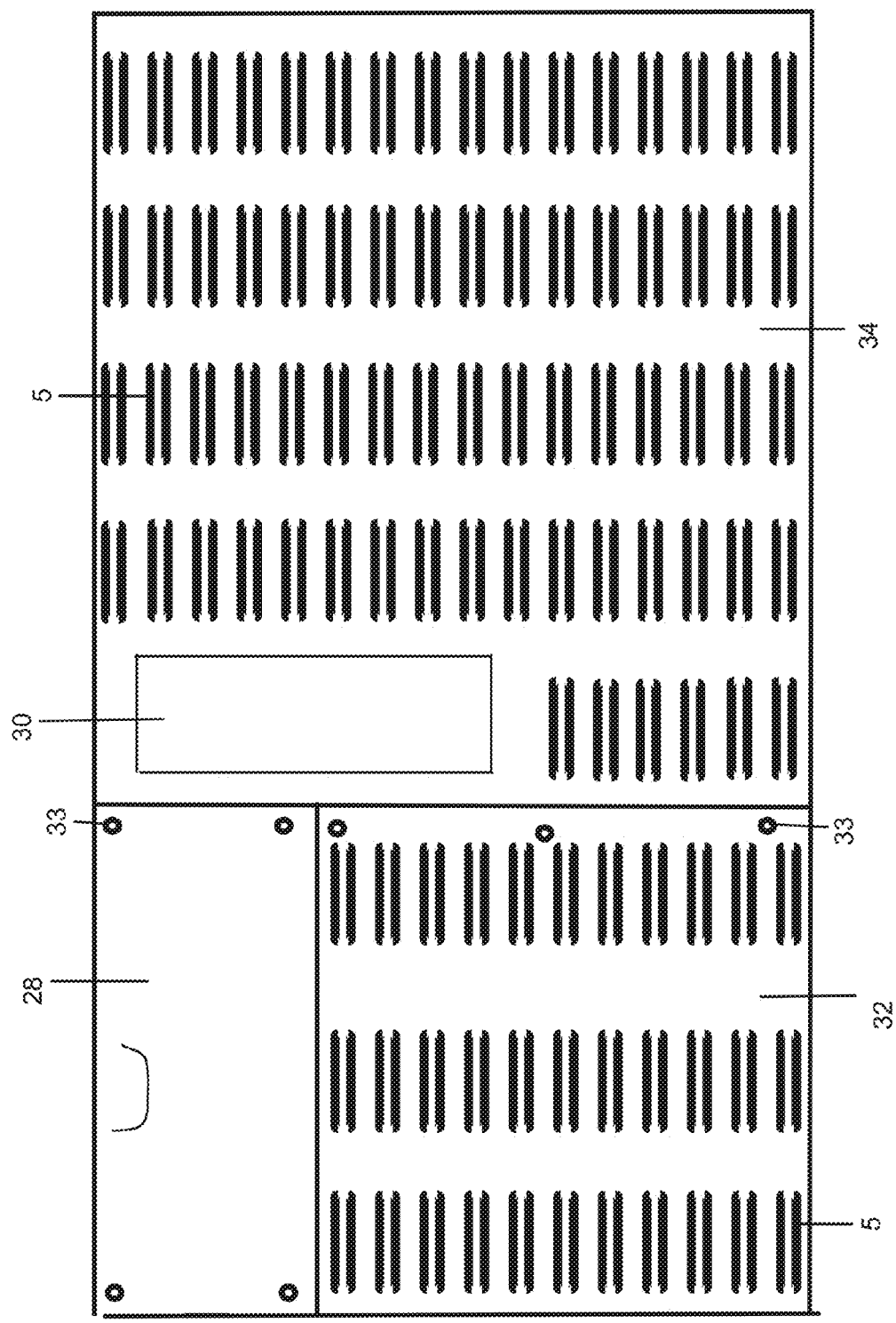
FIG. 3 depicts the left cabinet panel of the packaged unit embodiment of the HVAC Home Generator.

FIG. 3 illustrates the left outer cabinet panel 34. Left outer cabinet panel 34 is louvered with louvers 5 to allow air to flow into the HVAC packaged unit yet prevents the flow of water into the unit. Generator left cabinet panel 32 includes louvers 5 that allow air to flow into the generator chamber 56 (shown in FIG. 4) to supply oxygen to the generator for the production of energy while preventing the entry of water through generator left panel 32. Generator exhaust hood 30 allows exhaust fumes and heat from generator 200 operation to be exhausted out of the unit. The generator controls are accessed via generator control cabinet panel 28 which may be removed via removal of screws 33. Generator left cabinet panel 32 is louvered with louvers 5 to allow air to enter generator compartment 56 (shown in FIG. 4). Removal of screws 33 positioned on generator left cabinet panel 32 allows access to generator compartment 56 (shown in FIG. 4) and generator 200 (shown in FIG. 4).

Figure 4:
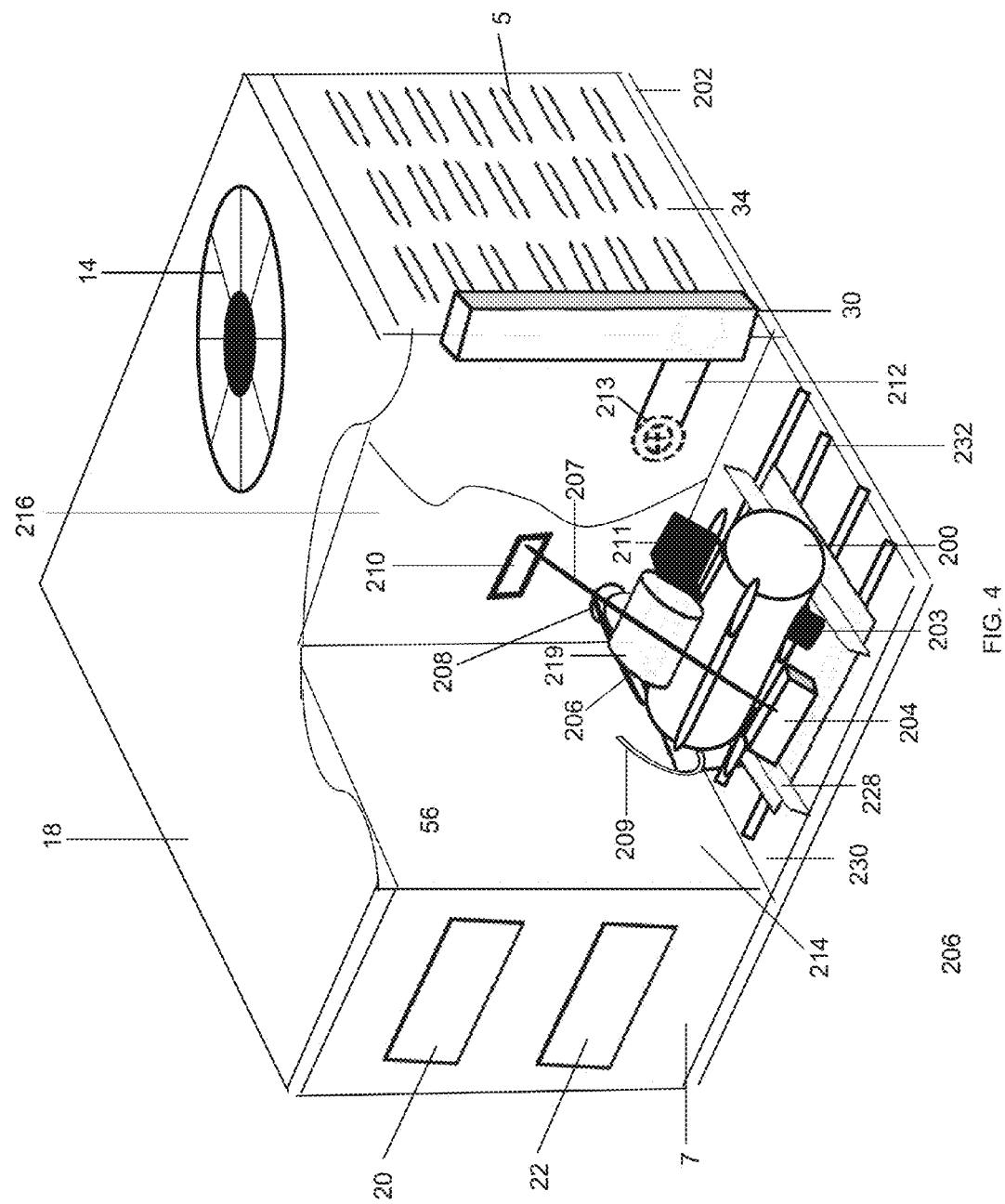
FIG. 4 is an angled view showing the top, rear and left cabinet panels of the packaged unit HVAC Home Generator with a portion of the top, rear and left cabinet panels cut away.

Top 18, rear 7, and left 34 cabinet panels are shown in FIG. 4. In FIG. 4, generator hard cabinet panel 24, generator grid panel 26, generator control cabinet panel 28, and generator left cabinet panel 32 have been removed from the device to expose the generator chamber 56. Generator 200 is positioned within the cabinet and is ready to be operated in this position. Generator chamber 56 is formed by air duct separator panel 214, left separator panel 216, and the HVAC unit base 202. Both air duct separator panel 214 and left separator panel 216 are insulated with a material that meets or exceeds the National Fire Protection Association 90 flame retardance requirements and has a "R" value of 3.70 as a minimum. The addition of the insulation to air duct separator panel 214 and left separator panel 216 reduces the level of noise emitted from the HVAC Home Generator when generator 200 is operating.

Generator 200 is mounted onto a telescoping mounting assembly (composed of generator mounting plate 218, telescoping mounting base 230, and telescoping mounting slides 232)(shown in FIGS. 5A, 5B, 5C, 6A and 6B) via generator mounts 228 and shocks 203. Shocks 203 absorb vibration from the operation of generator 200, which reduces the noise produced during the operation of generator 200. Shocks 203 may be composed of rubber or be any other form of shock absorber suitable for use with a generator. Generator mounts 228 are of sufficient length and width to tightly anchor generator 200 to telescoping mounting plate 218. Generator 200 may be either a natural gas generator or a liquified propane generator. Liquid propane or natural gas to supply generator 200 is supplied via flexible gas line 206 that runs from the gas transducer of the HVAC unit (shown in FIGS. 8 and 9). Gas line opening 208 allows flexible gas line 206 to be run from the gas transducer, which is positioned behind left cabinet panel 34, through left panel separator 216, into generator chamber 56 and connected to generator 200. Optionally, natural gas or liquified propane may be supplied to generator 200 via portable tank flexible gas line 209 that connects to control panel 60 (shown in FIG. 11). If the home or residence has access to liquid propane or natural gas, but the current HVAC system is all electric, then liquid propane or natural gas should be routed separately to generator 200. If neither liquid propane or natural gas is available at the current location, then a portable propane tank may be utilized to supply the HVAC Home Generator. This permits a user to disconnect a portable propane tank from a barbeque grill and connect it to the HVAC Home Generator to power generator 200.

Figure 10:
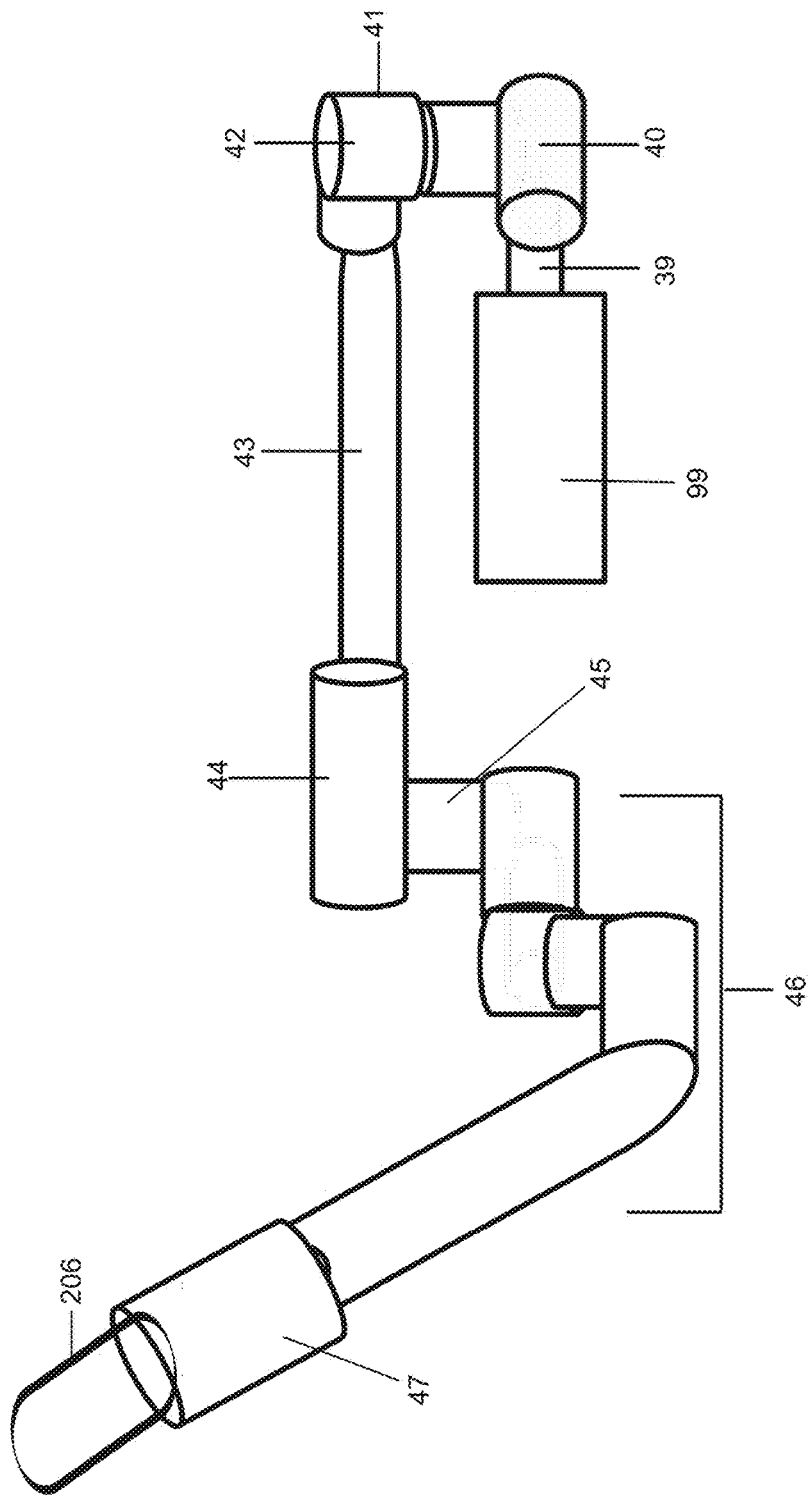
FIG. 10 illustrates a side view of the gas supply configuration of the packaged unit HVAC Home Generator.

Battery 204 is wired to generator 200 via an electric wire 309 (shown in FIG. 12) to ensure that generator 200 starts smoothly each and every time. Battery 204 has a sensor with antenna that can digitally report the charged status to a user's smart phone, handheld notebook, personal computer or other electronic device. The sensor will report percentage of charge and flash red if the charge contained within battery 204 falls below a predetermined value such as 90 (ninety) percent. Battery 204 is wired to battery charger 210 via electric wire 207, which may be secured to left panel separator 216. Inline battery charger 210 may provide 1.5 amps, which maintains battery 204 at a charge level of 90%. As shown in FIG. 10, battery charger 210 receives power from the home's breaker box 302. Battery charger 210 is a fully automatic UL-approved onboard battery. Battery charger 210 receives electrical power from breaker box 302 or from HVAC unit 306 (shown in FIG. 12). Battery charger 210 does not receive power from generator 200, which only generates power when powered "ON" during an electrical outage or during other periods of operation, such as routine testing.

Generator exhaust 219 aligns with muffler 211 to move exhaust fumes from generator 200. Muffler 211 is attached onto generator exhaust 219, which is anchored to generator 200. Muffler 211 moves with generator 200 during maintenance or service. Muffler 211 pumps exhaust fumes and heat from generator 200 into exhaust fan 213, reducing the noise produced by generator 200 while cooling generator 200. Exhaust fan 213 may be permanently fixed to left separator panel 216 so that the fan is open to generator chamber 56 and can receive fumes and heat generated by generator 200. Exhaust fan 213 may be a squirrel-cage induction motor or any other suitable motor. Exhaust fan 213 pumps the exhaust fumes and heat through exhaust pipe 212 and out generator exhaust outlet hood 30 and into the surrounding environment. Exhaust fan 213 reduces the temperature in generator chamber 56 from 93° C. to 23° C. while generator 200 is operating. Additionally, exhaust fan 213 reduces the noise emitted from the HVAC Home Generator from 79 dB to 70 dB while generator 200 is operating.

Figure 5:
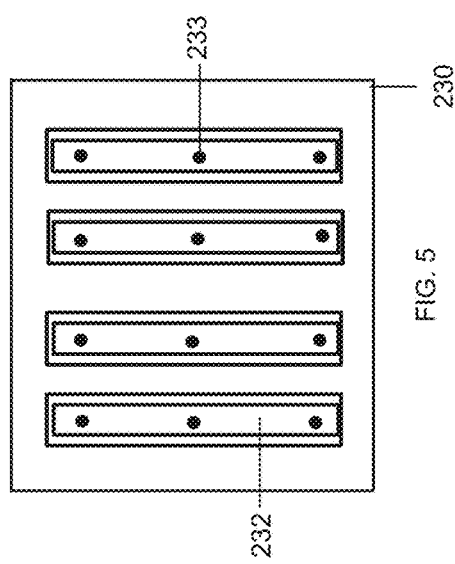
FIG. 5 illustrates the top view of the telescoping mounting base.

All natural gas and liquified propane generators must be maintained or serviced to ensure proper performance. Maintenance includes changing the oil in the generator after a certain preset number of hours of use. Generators are typically mobile units so that a user can rotate and manipulate the generator to maintain and service it. A generator can not be included into a metal cabinet such as a air conditioning unit unless a user has access to maintain critical parts of the generator, such as access to change the generator oil. In order to combine a generator with a standard HVAC unit, the generator must be positioned so that it can readily be serviced. The HVAC Home Generator accomplishes this requirement by firmly anchoring generator 200 onto generator mounting base 218. FIG. 5 depicts a top view of the telescoping mounting assembly that allows a user to readily maintain and service generator 200. Telescoping mounting base 230 is composed of a strong, rigid, heat tolerant, and non-corrosive material such as ¼ inch thick steel. Telescoping mounting base 230 may be tack welded to cabinet base 202 so that it will not move when generator 200 is repositioned for servicing. Alternatively, telescoping mounting base 230 may have openings drilled out so that it can be machine screwed onto cabinet base 202.

FIG. 5A illustrates a top view of telescoping mounting base 230. One or more telescoping slides 232 are welded to the surface of telescoping mounting base 230. Alternatively, one or more telescoping slides 232 may be screwed onto telescoping mounting base 230 via screws tapped into pre-drilled openings on base 230. Optimally, 4 telescoping slides 232 are screwed onto telescoping mounting base 230. The use of 4 telescoping slides 232 allows generator 200 to be sized smaller or larger to meet the electrical needs of the user. Four telescoping slides 232 allows the weight of generator 200 to be evenly distributed so that generator 200 easily slides reversibly into and out of generator chamber 56 with one hand lightly exerting a pulling force on generator 200. A handle may be attached to generator 200 or generator mounting base 218. Telescoping slides 232 may be composed of any material that is strong, rigid, heat tolerant, and non-corrosive such as 14 gauge cold hardened rolled steel with a clear zinc commercial plating. Telescoping slides 232 may have a load capacity in excess of 100 kg with 100% static load safety factor at full extension. Slides 232 may be solid ball bearing-type slides with lubricant applied to said solid ball bearings having a temperature range of −42.8° C. to 176.7° C. Lubricant should retard and resist corrosion, water, dust and dirt build-up and wear. Lubricant should prevent seizure while allowing increased threaded joint tightening.

Figure 6:
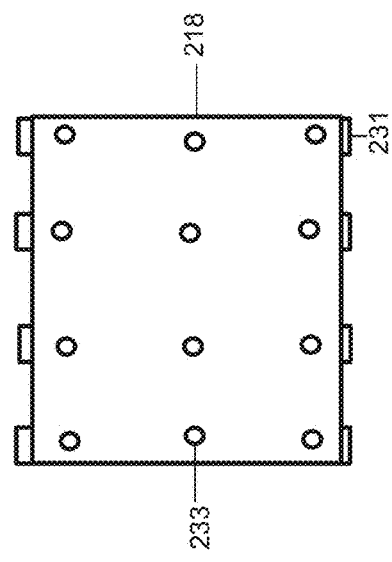
FIG. 6 depicts a top view of the generator mounting base.

A top view of generator mounting base 218 is depicted in FIG. 6. Generator mounting base 218 may be composed of ¼ inch steel or other suitable strong, rigid, heat tolerant, and non-corrosive material. Generator 200 is mounted to generator mounting base 218 via mounting brackets 228, shown in FIGS. 4 and 6, and shocks 203. Telescoping mounting slide guides 231 are tack welded onto the bottom side of generator mounting base 218. Alternatively, round openings may be bored into generator mounting base 218 and telescoping mounting slide guides may be screwed onto generator mounting base 218 via multiple screws 233. Telescoping mounting slide guides provide a guide for the movement of telescoping mounting slides 232 via solid ball bearings.

Figure 7B:
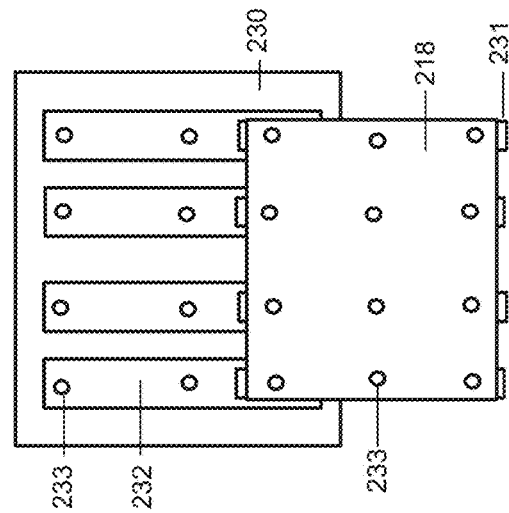
FIG. 7B shows a top view of the generator mounting base atop the telescoping mounting base with the generator mounting base extended for servicing the generator.
Figure 7A:
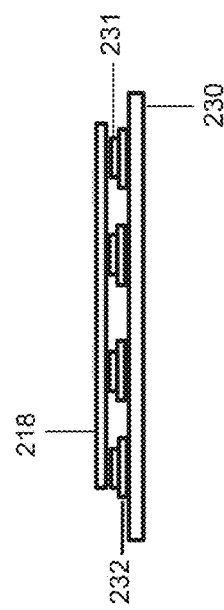
FIG. 7A shows a side view of the generator mounting base atop the telescoping mounting base.

FIG. 7 illustrates a side view of the telescoping mounting assembly as positioned within the HVAC Home Generator. Generator mounting base 218 is in contact with one or more telescoping mounting slides 232 via telescoping mounting slide guides 231. Telescoping mounting slides 232 are in contact with telescoping mounting base 230. FIG. 7B illustrates the telescoping mounting assembly with generator mounting base 218 extended from generator chamber 56 during maintenance and service of generator 200. The full weight of generator 200 is supported upon generator mounting base 218 so that generator 200 is extended horizontally from cabinet base 202 and perpendicularly from air duct separator panel 214.

Generator 200 must be tightly anchored to generator mounting base 218 and telescoping mounting base 230 must be tightly secured to cabinet base 202 to prevent any vibration of generator 200 during operation. The telescoping assembly must be lubricated and installed in a level, horizontal orientation to prevent vibration of generator 200 during operation. The elimination of vibration during generator 200 operation materially reduces noise production, allowing the operation of generator 200 at acceptable dB levels.

Figure 8:
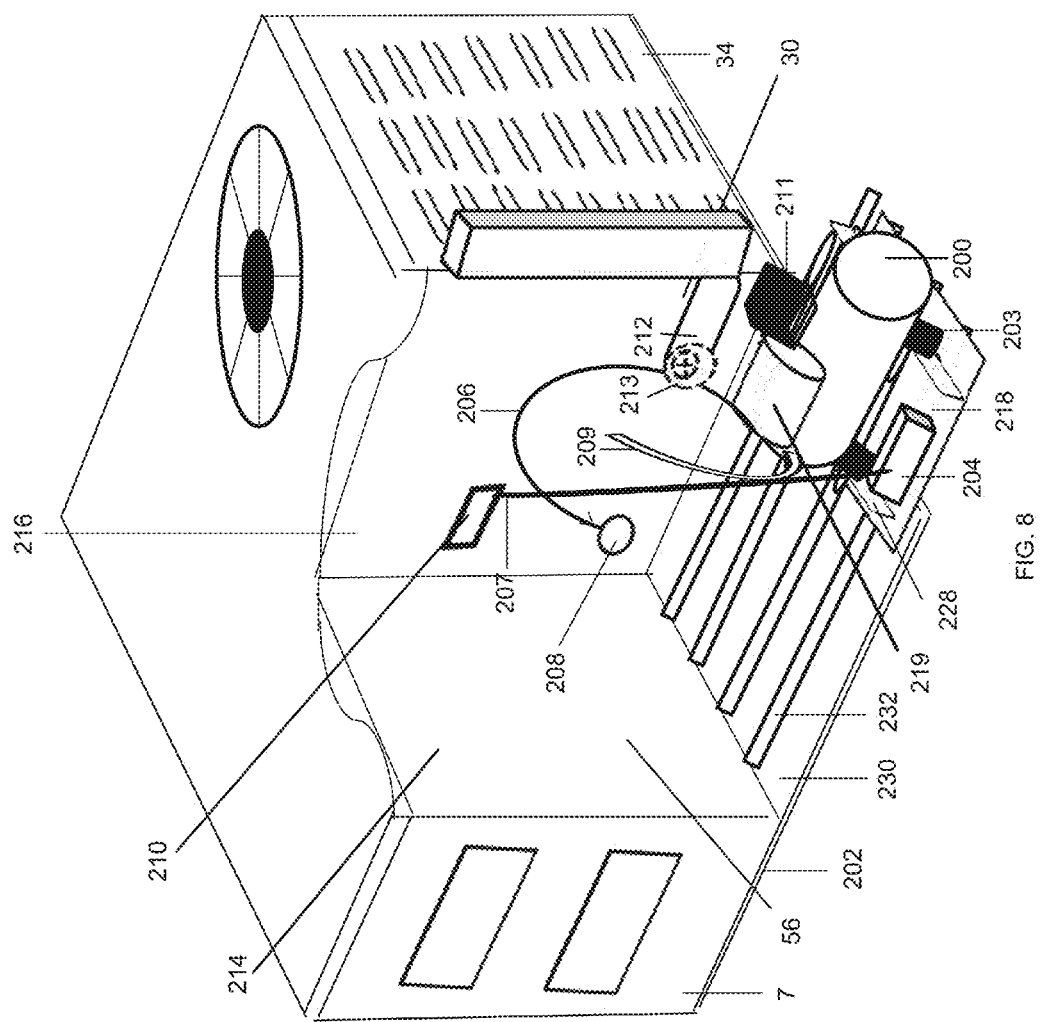
FIG. 8 is an angled view showing the top, rear and left cabinet panels of the gas line of the packaged unit HVAC Home Generator with a portion of the top, rear and left cabinet panels cut away and the generator positioned for servicing.

FIG. 8 illustrates an angled view of the top 18, rear 7, and left 34 cabinet panels with a portion of said top, rear, and left cabinet panels cut away to show the generator chamber 56. FIG. 7 illustrates generator 200 positioned outside of generator chamber 56 for maintenance and servicing. In order to access generator 200 for maintenance and servicing, generator left panel 32 must be removed by the user. Once generator left panel 32 is removed by unscrewing one or more screws 33, a user can reversibly pull generator mounting base 218 outward away from air duct separator panel 214 until it can be safely serviced. As generator 200 is moved outward from the cabinet, flexible gas line 206, flexible portable tank gas line 209, and all electric wiring including electric wiring 207 flex with generator 200 until taunt to allow for the movement of generator 200 with the telescoping mounting assembly. Additionally, while generator 200 is moved outward from the cabinet, muffler 211 reversibly loses contact with exhaust fan 213. Following maintenance, generator 200 is pushed back into generator chamber 56 until it locks into operable position. When generator 200 is returned to operable position, flexible gas line 206 and electric wiring 207 flex back to an less-than-taunt position, and muffler 211 aligns with exhaust fan 213.

Figure 9:
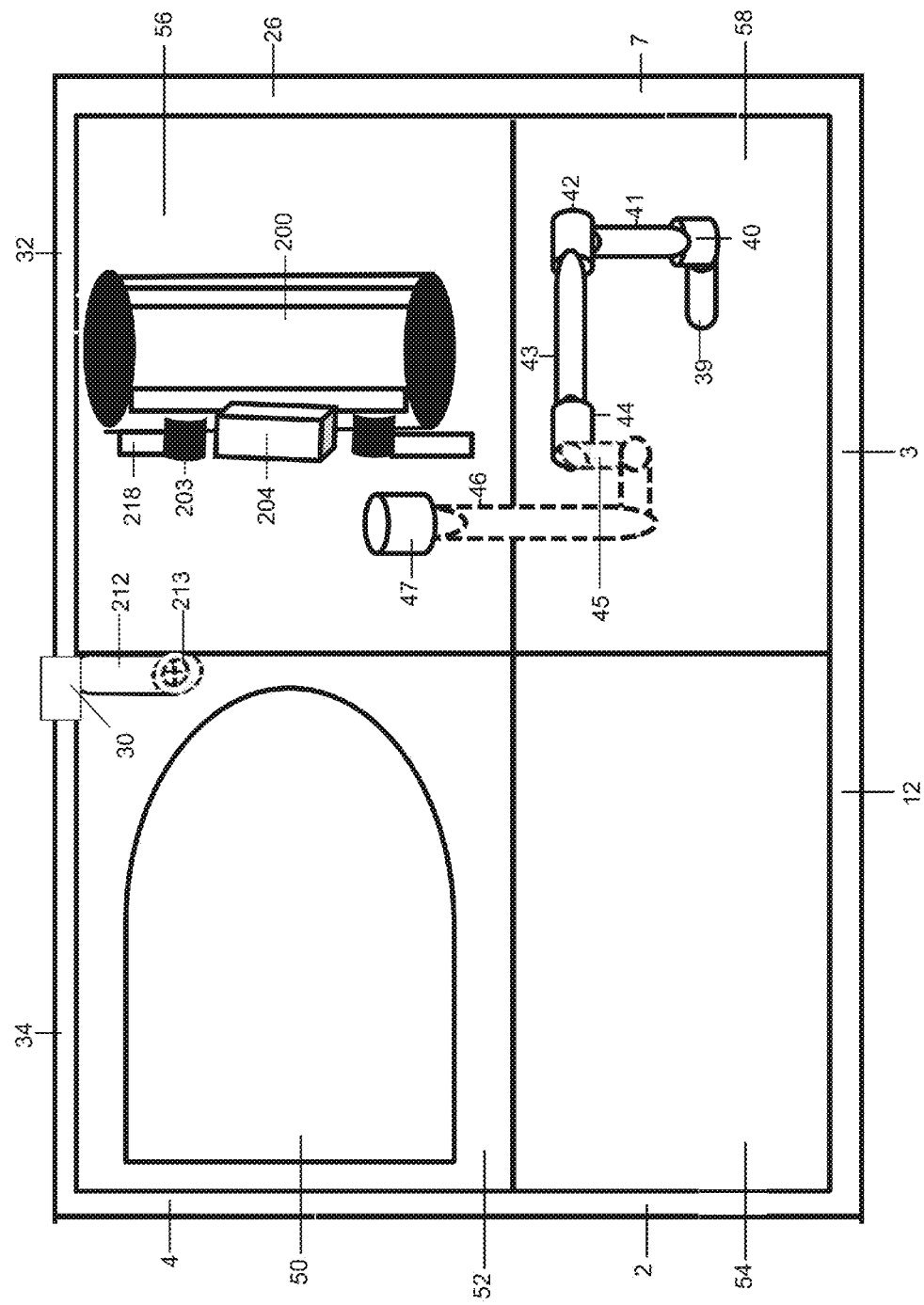
FIG. 9 depicts a top view of the floor plan of the packaged unit HVAC Home Generator.

The HVAC Home Generator includes necessary air conditioning and heating components, and home generator all in one device. The relative locations of principle functions of the HVAC Home Generator packaged unit is depicted in FIG. 9. The following cabinet panels are illustrated in FIG. 9: front panel 2, outdoor protective grill 4, left outer panel 34, generator left panel 32, generator grid panel 26, rear panel 7, right panel 3, and blower access panel 12. The supply 22 and return 22 ducts may be housed within duct chamber 58. Generator 200, battery 204, telescoping mounting assembly including generator mounting base 218, and shocks 203 may be housed in generator chamber 56. Evaporator coil 50 may be housed in evaporator coil chamber 52. The shape of coil 52 may be manipulated from a linear shape to a half-circle shape or other suitable shape so that exhaust fan 213, exhaust pipe 212, and generator exhaust outlet hood 30 are fitted within evaporator coil chamber 52. The evaporator blower is housed in evaporator blower chamber 54. Alternative configurations of the chambers may be utilized so long as the ultimate configuration provides for the incorporation of generator 200 with the other necessary HVAC components into one embodiment. Generator gas line, which includes inline gas valve pipe 39, inline "T" fitting 40, close nipple fitting 41, nipple "T" fitting 42, linear pipe 43, inline gas valve coupling 44, generator to inline valve fitting 45, angled pipe 46, and generator chamber fitting 47 is shown housed within duct chamber 58. Generator gas line originates at pipe 39 which is fitted onto HVAC inline gas valve control 99 (shown in FIG. 10). Generator chamber fitting 47 connects to flexible gas line 206 (shown in FIG. 4).

Natural gas or liquid propane powering the heating functions of the HVAC unit may be tapped to provide an energy source for generator 200. FIG. 10 depicts a side view of how the natural gas or liquid propane source within the HVAC unit may be split and diverted to generator 200. The HVAC unit inline gas valve control 99 controls the flow of natural gas or liquified propane to the HVAC unit. The HVAC unit inline gas valve control 99 may be located within air duct chamber 58. Pipe 39 may be connected to the HVAC unit inline gas valve control 99 to divert the flow of natural gas or liquified propane to generator 200. Pipe 39, and all piping including 40 through 47, are composed of schedule 40, ½ inch black iron pipe. Vibration resistant pipe thread sealant is used to seal all pipe joints formed by schedule 40, ½ inch black iron pipe. Inline gas valve pipe 39, inline "T" fitting 40, close nipple fitting 41, nipple "T" fitting 42, linear pipe 43, inline gas valve coupling 44, and generator to inline valve fitting 45 transfer natural gas or liquified propane from inline gas valve control 99, around the unit's heat exchanger within air duct chamber 58. Generator to inline valve fitting 45 dips below cabinet base 202 and connects to angled pipe 46, which is positioned below base cabinet 202. Angled pipe 46 is positioned beneath the deck of cabinet base 202 and runs from of air duct chamber 58 to generator chamber 56. Angled pipe 46 is positioned beneath cabinet base 202 so that structures contained within air duct chamber 58 and within generator chamber 56 are not obstructed. Angled pipe 46 rises above cabinet base 202 and terminates at generator chamber fitting 47. Generator chamber fitting 47 traverses gas line opening 208 and attaches to flexible gas line 206, which supplies natural gas or propane to generator 200. If the supply of natural gas or liquified propane is terminated or intermittent during an electrical outage, liquified propane from a portable propane tank, such as a tank from a barbeque grill, may be utilized as an energy supply to operate generator 200. Control panel 60 includes propane tank port 78 that allows a portable propane tank to be connected to the HVAC Home Generator.

The HVAC Home Generator includes 120/240 volt operation with automatic voltage regulation. The device includes a low oil shut off feature and spark arrester while complying with all EPA emission requirements. Some embodiments of the HVAC Home Generator may include an automatic transfer switch to automatically initiate and automatically terminate generator 200 operation. Units not including an automatic transfer switch, must be manually operated by a user. Before initiating manual operation of generator 200, a user must ensure that main breaker 331 (shown in FIG. 13) is turned to the "OFF" position, which is noted on main breaker 331 (shown in FIG. 13). In order to manually operate the generator function of the HVAC Home Generator system, a user must remove generator hard panel 24 via screws 33 to access control panel 60, which may be located beneath generator hard panel 24. A front view of control panel 60 is depicted in FIG. 11. First, a user must verify that natural gas or liquified propane is being supplied to the HVAC Home Generator. If so, then the user must push start switch 76 to the "ON" position. If generator 200 fails to start after pushing start switch 76, then the user may slowly move choke switch 86 to the "RUN" position to turn on choke 82. After generator 200 starts, the user must return to breaker box 302 (shown in FIG. 12) and turn generator breaker 340 (shown in FIG. 13) to the "ON" position as marked on generator breaker 340 (shown in FIG. 13). To turn generator 200 off, the user flips generator breaker 340 (shown in FIG. 13) into the "OFF" position and flips main breaker 302 (shown in FIG. 13) into the "ON" position.

If the supply of natural gas or liquified propane has been disabled, generator 200 can be operated utilizing a portable liquified propane tank. First, main breaker 302 (shown in FIG. 13) must be flipped to the "OFF" position. Next, the regulator hose of the portable propane tank must be connected to propane tank port 78, located on control panel 60. Then the regulator valve located on the portable propane tank must be turned until it is in the "ON" position. Next, the user must turn fuel switch 62 into the "ON" position and push start button 76. Finally, generator breaker 340 (shown in FIG. 13) can be flipped to the "ON" position and the home or residence receives electrical power via generator 200. When electrical power is restored by the utility company, the user must flip generator breaker 340 (shown in FIG. 13) to the "OFF" position and flip main breaker 302 (shown in FIG. 13) to the "ON" position. Then the portable propane regulator valve can be returned to the "OFF" position and the regulator hose disconnected from portable propane tank port 78.

Control panel 60 includes generator fuse 74 that lights up to alert the user that generator 200 is receiving adequate electrical energy via generator battery 204. Generator battery charger 210 can be turned "OFF" and "ON" via generator batter charger switch 74.

FIG. 12 illustrates the electric flowchart for the HVAC Home Generator. Electric power enters the home or commercial building at meter 300, which transmits power to breaker box 302. Breaker box 302 contains all fuses for the home or commercial building. Generator 200 is wired into breaker box 302. Generator 200 is wired to power exhaust fan 213. Generator 200 may optionally be wired via antenna 77 to internet control 325 to allow the transmission of data via internet control 325 to a wireless connection utilized by a user such as a smart phone, electronic notebook, or a computer. Internet control 325 transmits to a user information relating to the status of the generator, including but not limited to: battery 204 charge level, whether battery charger 210 is receiving power via breaker box 302, whether fuse 74 is in "ON" or "OFF", whether start switch 76 has been activated, and whether portable propane port 78 is being accessed. Generator battery 204 receives power from battery charger 210, which is powered through breaker box 302. Battery 204 is necessary to ensure that generator 200 starts each and every time when needed. Battery charger 210 receives electrical power from breaker box 302 to ensure that battery 204 is continuously charged to a level of 90%. HVAC unit 306 is connected to breaker box 302 through feedback switch 310, which allows HVAC unit 306 and generator 200 to function as one unit with feedback being transmitted between HVAC unit 306 and generator 200. HVAC unit 306 includes antenna 79 to allow information relating to said HVAC unit such as the status of battery charge 75 to be transmitted to internet control 325.

Figure 13:
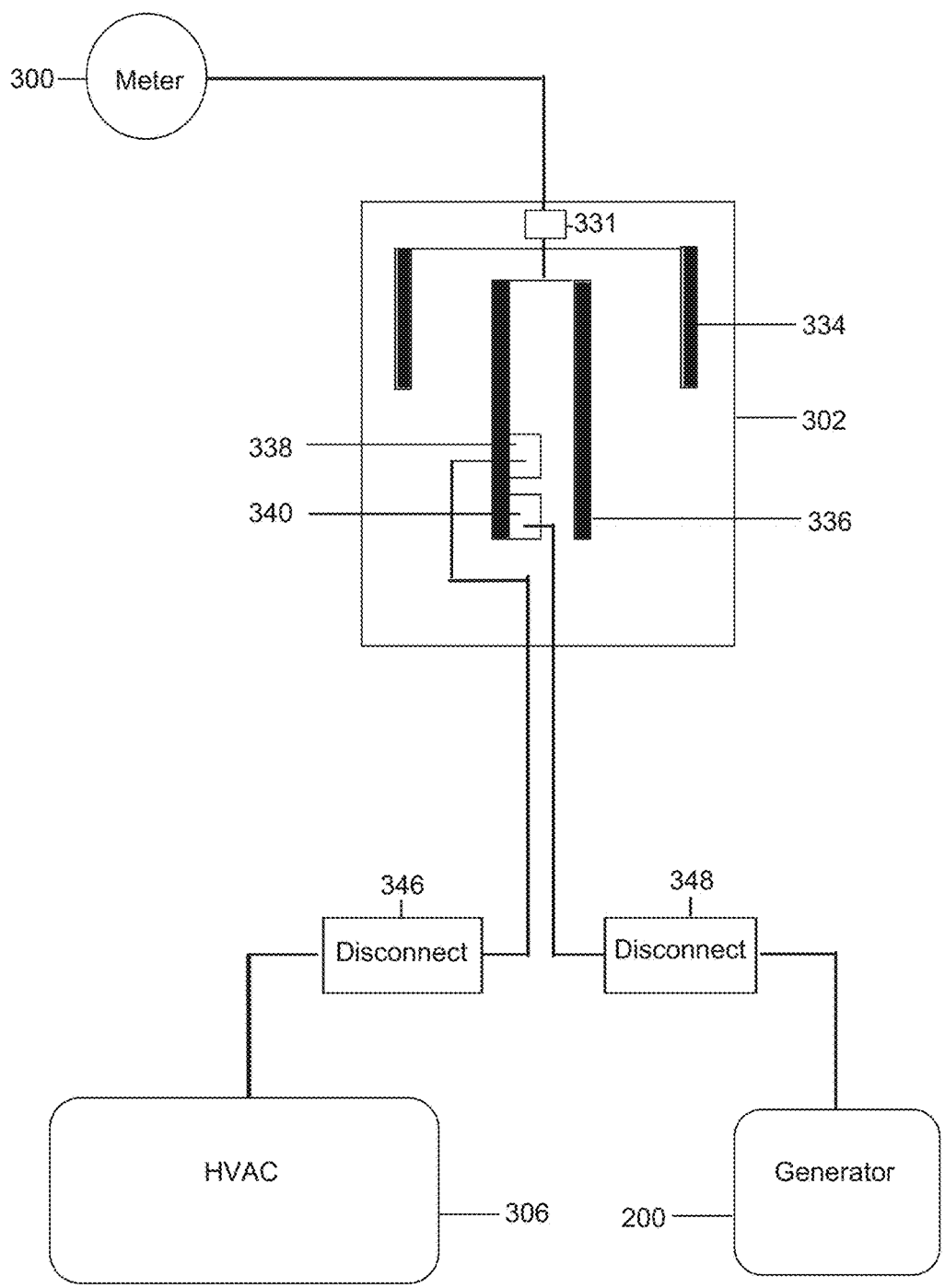
FIG. 13 is a diagram depicting a representative wiring schematic for wiring the HVAC Home Generator into a home breaker box

FIG. 13 illustrates a method of wiring generator 200 into the home or commercial business electrical wiring system so that electrical power produced from generator 200 can safely power the home or residence. Electrical power enters the home or business through meter 300, which transmits said power to breaker box 302. Within breaker box 302 is main breaker 331 that terminates the flow of electrical power from meter 300 to the home when main breaker is placed in the "OFF" position as noted on said main breaker 331. Breaker box 302 may contains two neutral bars 334 and two bus bars 336. The building is wired so that each designated circuit runs through breaker box 302 with the neutral wire of each circuit secured onto neutral bars 334 and the hot or live wire of each circuit secured onto bus bars 336. Some breaker boxes 302 may contain a single bus bar 336 that is used to secure all hot or live wires connected through a particular breaker box 302. Fuses are positioned along bus bars 336 to allow a user to control whether a particular circuit receives electrical power. HVAC fuse 338 connects the HVAC circuit to breaker box 302. The HVAC circuit flows from HVAC 306 through HVAC quick disconnect 346 to HVAC fuse 338. HVAC quick disconnect 346 is usually positioned outside of the home or commercial building at a preset distance from HVAC unit 346, typically less than 5 (five) feet from HVAC unit 346. Generator fuse 340 controls power to generator 200. Generator quick disconnect 348 may be located outside of the home or commercial building within an arms length of the HVAC Home Generator so that a user can quickly disconnect terminate generator power.

When generator 200 is not in use, generator fuse 340 is in the "OFF" position and power from the meter is not transmitted to generator 200. When generator power is needed, main breaker 331 is moved to its "OFF" position and generator fuse 340 is moved to its "ON" position. Main breaker 331 must be flipped to its "OFF" position before generator power is supplied to breaker box 302 to prevent excess electrical power from moving back from the meter to the utility lines. Main breaker 331 may be manually turned "ON" and "OFF" by a user or this this can be performed automatically when power to the home or commercial building is terminated by an automatic transfer switch. A number of automatic transfer switches are commercially available. Excess electrical power could harm a utility employee servicing a line or endanger individuals near a downed power line. Once both main breaker 331 is "OFF" and generator fuse 340 is turned "ON", then electrical power from generator 200 is transmitted along the generator circuit, through generator fuse 340, and to bus bars 336. Generator 200 feeds electrical power to bus bars 336, which indiscriminately provide power to all circuits with fuses in the "ON" position. If a particular circuit is not needed, a user can turn the corresponding fuse to the "OFF" position or simply not use a particular circuit. Because generator 200 may potentially power all circuits, the size of generator 200 must correspond to the electrical needs of the home or commercial building.

If the generator installed in the HVAC Home Generator is too small to meet the demands of the home or commercial building, the generator may surge to attempt to produce sufficient electrical power. This surging creates excess noise that may be unacceptable and cause the noise emitted from the HVAC unit 306 (shown in FIG. 13) to rise above the limits set by local residential and commercial codes. This problem can be minimized by properly sizing the generator for the needs of the residence or commercial building. A home or office does not typically use the entire wattage provided in the breaker box because a user does not have every light, every outlet, and every appliance powered "ON" at one time. So, the power needs of the home or building at any given time can be estimated to determine the minimum electrical output of the generator needed. The percent of daily use of running wattage of normally used electrical devices may be calculated to estimate the daily wattage used for each electrical device. The wattage of all normally used electrical devices may be added to calculate the necessary wattage output required from a generator. For example, a typically home can be expected to use a heating/cooling unit, box fan, clock radio, coffee maker, computer and monitor, deep freezer, DVD/VCR player, fire place fan motor, garage door opener, stove top for cooking, 10 rooms of lights, a microwave oven, a refrigerator/freezer, a television, and an electric water heater. See Table 1, below. The combined wattage of all of these devices is 6,942 watts. A generator providing 7,000 watts of electrical output would provide all of the power for each of these household devices.

TABLE 1

Estimated wattage needs of a typical home.

| Electrical Device | Rated (Running) Watts | Percent Used Daily | Estimated WATTS needed |
|---|---|---|---|
| Heating/Cooling Unit | 1500 | 60% | 900 |
| Box Fan | 300 | 60% | 180 |
| Clock Radio (Am/FM) | 300 | 100% | 270 |
| Coffee Maker | 1500 | 15% | 225 |
| Computer & Monitor | 800 | 25% | 200 |
| Deep Freezer | 500 | 100% | 500 |
| DVD/VCR Player | 100 | 60% | 60 |
| Fire Place Fan Motor | 600 | 50% | 300 |
| Garage Door Opener | 480 | 15% | 72 |
| Stove (Cooking) | 3000 | 25% | 750 |
| Lights (per 10 rooms) | 500 | 75% | 375 |
| Microwave Oven | 1500 | 30% | 450 |
| Refrigerator/Freezer | 800 | 100% | 800 |
| Television | 600 | 60% | 360 |
| Electric Water Heater | (2 per) 3000 | 50% | 1500 |
| | 12,480 | | 6,942 | watts = volts × amperes.

Other methods of calculating the minimum wattage size of generator 200 may be employed.

FIGS. 14A through 18C illustrate the HVAC Home Generator incorporated into a stacked HVAC unit. Typically, stacked HVAC units include an outside cabinet that houses the air conditioning components of the ventilation system outside of the home or commercial building. The outside cabinet may sit on a concrete pad, be elevated above the ground or concrete pad by small, supporting feet, or be positioned a foot or more above the ground or concrete pad by legs on each corner of the unit. The HVAC Home Generator utilizes the design of the stacked unit to nest generator 200 beneath the stacked unit cabinet. Generator 200 is enclosed generator cabinet panels that include louvered vents 5 to promote cooling of generator 200 and removal of exhaust fumes and heat. Generator 200 can be accessed for maintenance or service by a user moving or removing a cabinet panel and pulling generator 200 along the telescoping slides 232.

The previous disclosures relating to the packaged embodiment apply to the stack unit embodiment with certain modifications that permit generator 200 to be installed beneath the stack HVAC unit.

Figure 14A:
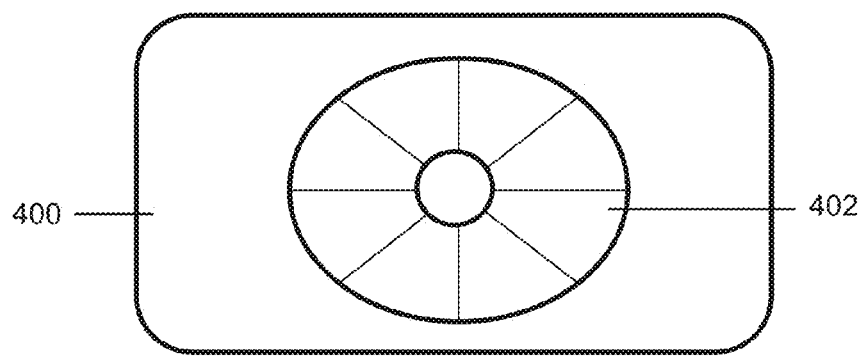
FIG. 14A is a top view of the stacked unit HVAC Home Generator.
Figure 14B:
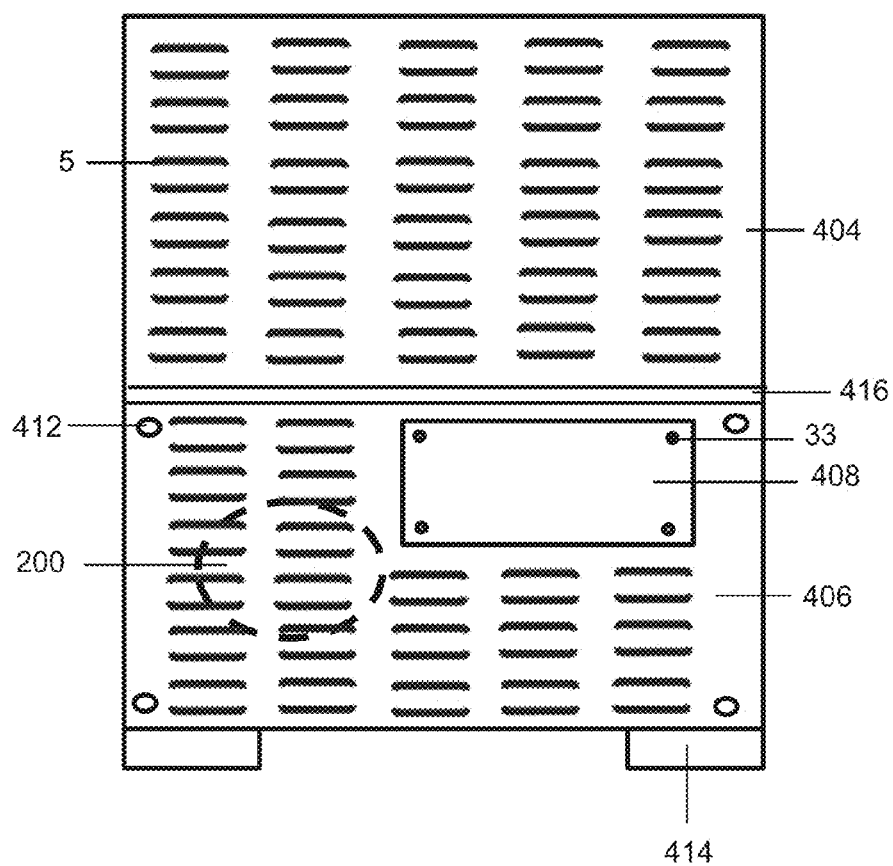
FIG. 14B is a side view of the left cabinet panel of the stacked unit HVAC Home Generator.
Figure 15:
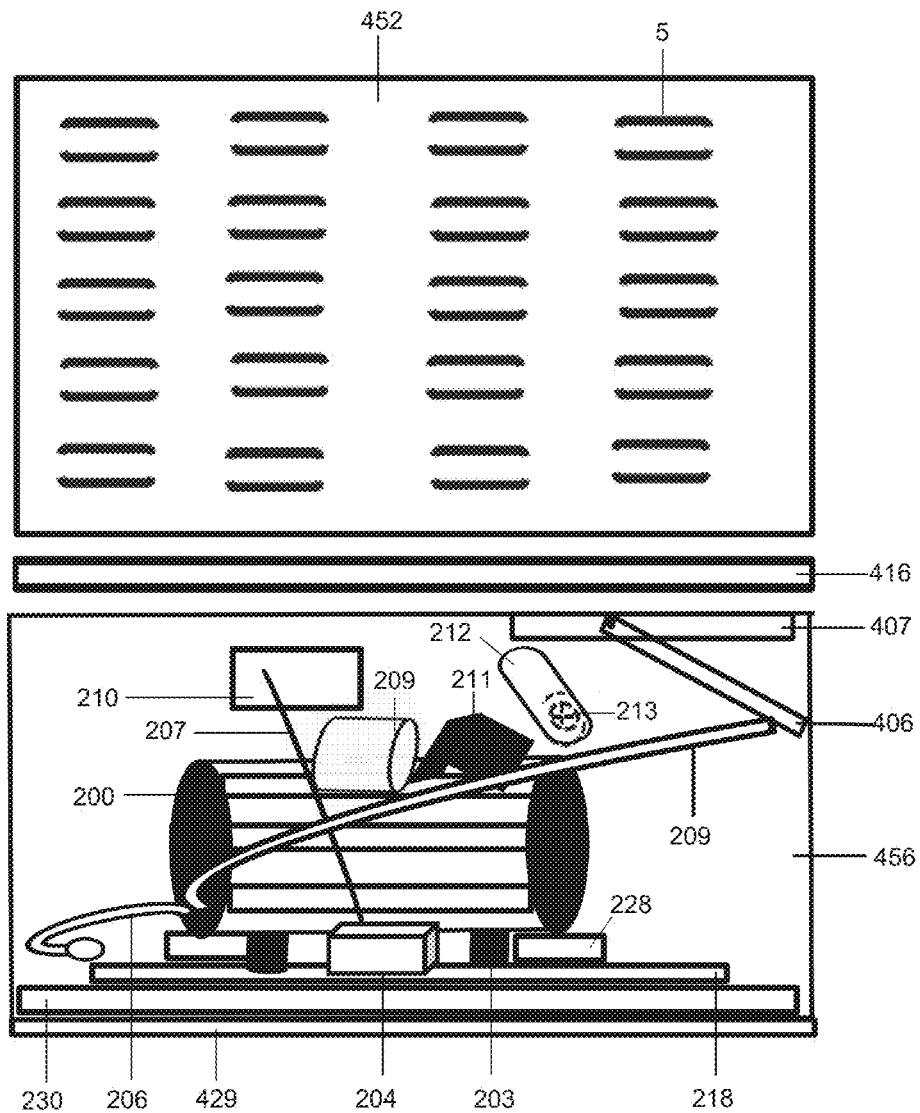
FIG. 15 illustrates a front view of the front cabinet panel of the stacked unit HVAC Home Generator with the generator front cabinet panel removed.
Figure 16:
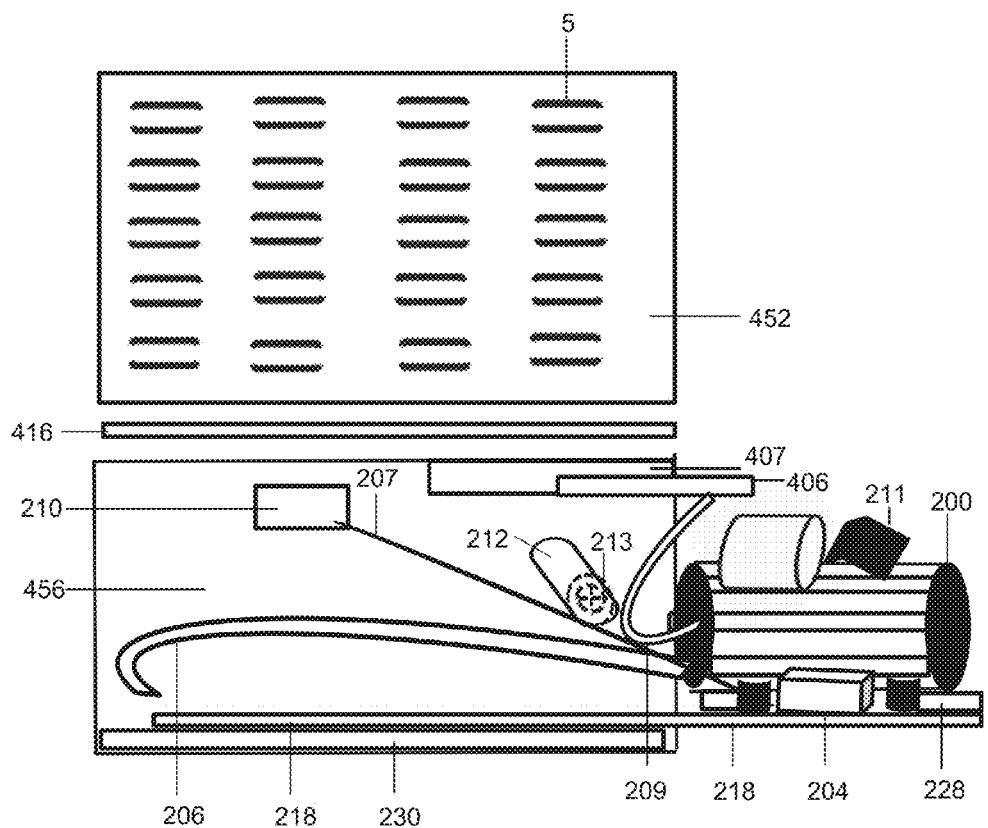
FIG. 16 illustrates a front view of the front cabinet panel of the stacked unit HVAC Home Generator with the generator front cabinet panel removed and the generator positioned for servicing.
Figure 17:
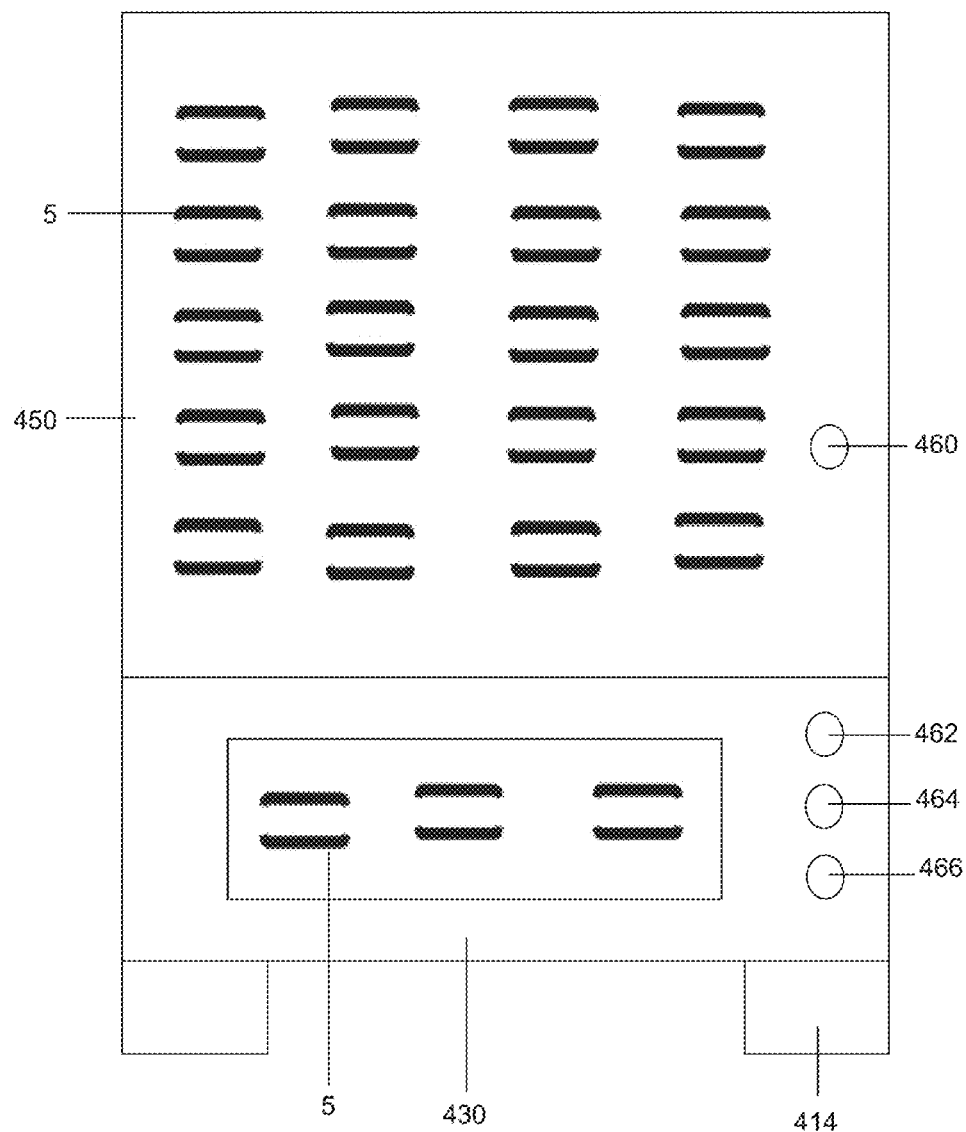
FIG. 17 illustrates a view of the rear cabinet panel of the stacked unit HVAC Home Generator. showing connections for electrical, fuel, and wiring.

FIG. 14A illustrates a top view of the stack HVAC Home Generator while FIG. 14B illustrates a front view, FIGS. 15 and 16 depict a front view with the front generator panel removed, and FIG. 17 shows a rear view of the stack unit embodiment. All exterior cabinet panels and generator separator plate 416 must be composed of a strong, corrosion-resistant, heat tolerant material such as galvanized steel which is bonderized and coated with a pre-painted and baked enamel finish. All interior surfaces of the stack cabinet, including the generator cabinet, have interior surfaces insulated with a minimum ½ inch, 1 lb density foil-faced cleanable insulation. Additionally, all cabinet panels and generator separator plate 416 may be insulated with a thermosetting resin (8 to 12% be weight nominal, phenol formaldehyde typical) material that meets or exceeds the National Fire Protection Association 90 flame retardance requirements and has a "R" value of 3.70 as a minimum.

Stack unit top panel 400 includes fan 402 to discharge air upwards away from the HVAC unit. FIG. 14B depicts the front view of the stack embodiment of the HVAC Home Generator. HVAC front panel 404 includes a number of louvers 5 to permit sufficient air circulation to feed the air conditioning components. Components associated with the air conditioning functions of the device are housed behind HVAC front panel 404. Generator separator plate 416 is a fixed divider that separates the air conditioning components from the generator chamber 456 (shown in FIG. 15). Generator separator plate 416 forms the upper height of generator chamber 456 (shown in FIG. 15). All cabinet panels are secured onto the generator cabinet frame via non-corrosive screws 412. Generator access panel 408 is attached to front generator panel 406 via small non-corrosive screws 33. Generator access panel may be removed by a user to access generator control panel 60 (shown in FIG. 11). Generator 200 may be viewable through generator front panel 406. The stack embodiment is supported by generator feet 414, which are positioned on the outer edge of each corner of the unit to support the weight of the HVAC Home Generator.

FIG. 15 illustrates a front view of the with generator front panel 406 removed and with generator 200 fully contained within generator chamber 456. Generator front panel 406 may be removed by a user unscrewing all screws 412 (shown in FIG. 14B) positioned on generator front panel 406. Upon removing generator access panel 408, control panel 60 may reversibly slide along control panel slide guide 61 so that control panel 60 is positioned outside of generator chamber 456 and is horizontal. Control panel 60 may be positioned horizontally to facilitate maintenance and service by a user (shown in FIG. 16) who is able to manipulate control panel 60 by looking down. Portable tank flexible gas line 209 is attached to generator control panel 60 and reversibly moves with generator control panel 60 without kinking to allow a user to attach a portable natural gas or liquified propane tank to the HVAC Home Generator to produce temporary electrical power. Generator 200 may be reversibly moved into and out of generator chamber 456 to allow a user access to maintain and service generator 200 as described above. Generator 200 is bolted onto generator mounting base 218 via mounting brackets 228 and shocks 203. Generator mounting base 218 connects to telescoping mounting base 230 via telescoping mounting slides 232 and telescoping mounting slide guides 231 as previously described and shown in FIG. 7B. Telescoping mounting base 230 is anchored to generator base plate 429. Battery 204 attaches to battery charger 210 via electric wire 206. Battery 204 ensures that generator 200 is fully charged and starts immediately whenever generator power is desired. Muffler 211 pumps heat and exhaust fumes out of generator chamber 407. Exhaust fan 213 moves heat and exhaust fumes out of generator chamber 456 and into the environment via exhaust pipe 212.

Generator 200 is depicted in position to be serviced in FIG. 16. Generator mounting base 218 has been fully extended from generator chamber 456 via telescoping mounting slides 232 (shown in FIG. 7B). Control panel 60 is extended outward so that it is horizontal with the ground to provide the user ease of access. Electric wire 207, flexible gas line 206, and portable tank flexible gas line 209 are all sufficient long and flexible to move fluidly without obstructing the transmission of electrical energy or the flow of natural gas or liquified propane, respectively. Once generator 200 has been serviced, generator 200 must be returned back into generator chamber 456 via telescoping mounting slides 232 before operating.

FIG. 17 illustrates the rear view of the HVAC Home Generator. The rear of the device faces the home or commercial building. All cabinet panels, including rear HVAC cabinet panel 450 and generator rear cabinet panel 430, are louvered 5. The stack unit embodiment may receive electrical power via rear HVAC cabinet panel 450 or via a side cabinet panel. Electrical power is shown entering the stack HVAC unit at electrical port 460. Generator 200 may receive electrical power, send electrical power, and receive natural gas or liquified propane at the rear or side of the device. Electrical port 462 receives electrical energy from breaker box 302 HVAC through HVAC fuse 338. Electrical power produced by generator 200 may be transmitted from the generator 200 through port 464 to bus bars 336 to power the energy needs of the building. Natural gas and liquified propane supplied to the home or commercial building may be diverted through port 466 to supply the gas needs of generator 200.

Figures 18A, 18B:
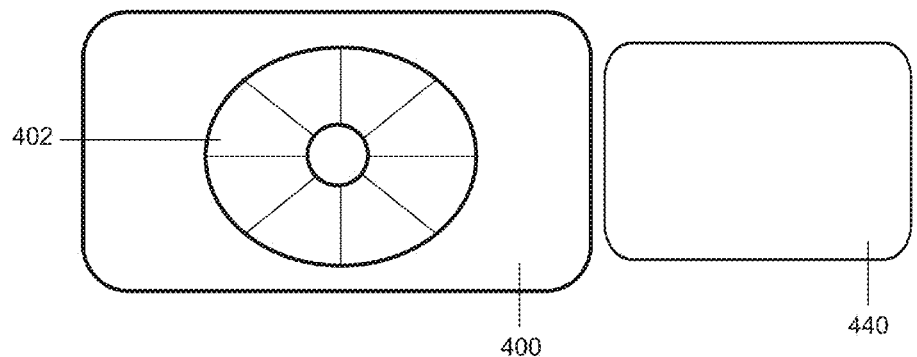
FIG. 18A depicts a top view of a stack HVAC unit and FIG. 18B depicts a view of the top cabinet panel of the retrofit embodiment of the HVAC Home Generator.
Figure 18C:
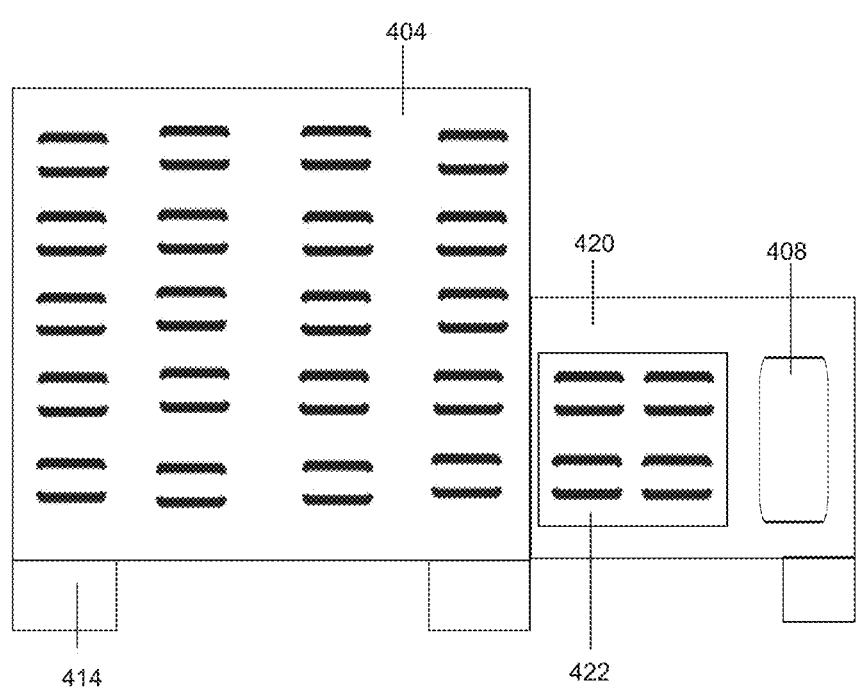
FIG. 18C depicts a front view of the HVAC Home Generator paired with a stack HVAC unit.

If sufficient space exists to retro fit a current stack unit with the HVAC Home Generator, then the invention herein may be attached, bolted or positioned near the existing stack unit. The retrofitted embodiment is depicted in FIGS. 18A, 18B, and 18C. FIG. 18A depicts the top cabinet panel 400 and fan 402 of the stack unit. FIG. 18B shows a top view of generator top cabinet panel 440. FIG. 18 C illustrates a side view of the retrofitted embodiment of the HVAC Home Generator. HVAC front cabinet panel 404 allows air to flow into and out of the exterior cabinet. The HVAC unit and the generator unit 420 rest upon 4 or more feet 414 that support the weight of all necessary components. The device may be bolted onto a concrete slab, on feet 414 or supported on legs above the ground (now shown). Generator cabinet front cabinet panel 422 allows air to flow into and out of the generator chamber 456 (shown in FIG. 15). Generator access cabinet panel 408 may be removed by a user to access generator control panel 60 (shown in FIG. 11). Generator 200 may be reversibly moved into and out of generator chamber 456 (not shown).

Having thus described our invention, and the manner of its use, it should be apparent to one of average skill in the arts that incidental changes may be made thereto that fairly fall within the scope of the following appended claims, wherein I claim:

1. A system for incorporating a generator and an electrically controlled air cooling unit into a cabinet located on an exterior of a building comprising:
a cabinet apparatus that forms at least one internal chamber,
wherein said cabinet apparatus forms a barrier to environmental elements while permitting air to flow into and out of said at least one internal chamber,
a generator apparatus mounted onto a telescoping mounting assembly and positioned in the at least one internal chamber of said cabinet apparatus,
wherein said telescoping mounting assembly is composed of a generator mounting plate, telescoping mounting base and telescoping mounting slides,
wherein said generator apparatus is configured to receive natural gas or liquified propane,
wherein said generator apparatus is electrically connected to a main breaker box that supplies electrical power to a building,
wherein said generator apparatus utilizes natural gas or liquified propane to produce electrical power,
wherein said electrical power produced by said generator apparatus is used to power at least one electronic apparatus connected to said main breaker box, and
said electrically controlled air cooling unit positioned in the at least one internal chamber of said cabinet apparatus,
wherein said electrically controlled air cooling unit provides cooled air to an interior of said building, and
wherein said electrically controlled air cooling unit is electrically connected to said main breaker box.

2. The system of claim 1, wherein said generator apparatus is positioned upon a telescoping slide that allows said generator to be reversibly positioned outside of said internal chamber of said cabinet apparatus.

3. The system of claim 1, further comprising an exhaust fan to relieve said internal chamber of said cabinet apparatus of heat and exhaust fumes produced during the operation of said generator apparatus.

4. The system of claim 1, further comprising a battery electrically connected to said generator apparatus.

5. The system of claim 4, further comprising a battery charger electrically connected to said battery.

6. The system of claim 1, wherein said generator apparatus receives natural gas or liquified propane from a self contained fuel source, wherein said self contained fuel source is positioned outside said cabinet apparatus.

7. The system of claim 1, further comprising a monitoring apparatus in electrical connection with the generator apparatus, which is configured to monitor the supply of power to the main breaker box to from the generator apparatus, the supply of power produced from the generator apparatus, and the percentage of battery charge.

8. The system of claim 1, wherein said generator apparatus is in the internal chamber positioned below said air cooling unit.

9. The system of claim 1, further comprising an electrically controlled air heating unit positioned in the internal chamber of said cabinet apparatus, wherein said air heating unit provides heated air to the interior of said building.

10. An apparatus that incorporates a generator and an electrically controlled air cooling unit into a cabinet located on an exterior of a building comprising:
a cabinet apparatus that forms at least one internal chamber,
wherein said cabinet apparatus forms a barrier to environmental elements while permitting air to flow into and out of said at least one internal chamber,
a generator apparatus mounted onto a telescoping mounting assembly and positioned in the at least one internal chamber of said cabinet apparatus,
wherein said telescoping mounting assembly is composed of a generator mounting plate, telescoping mounting base and telescoping mounting slides,
wherein said generator apparatus is configured to receive natural gas or liquified propane,
wherein said generator apparatus is electrically connected to a main breaker box that supplies electrical power to a building,
wherein said generator apparatus utilizes natural gas or liquified propane to produce electrical power,
wherein said electrical power produced by said generator apparatus is used to power at least one electronic apparatus connected to said main breaker box, and said electrically controlled air cooling unit positioned in the at least one internal chamber of said cabinet apparatus,
wherein said electrically controlled air cooling unit provides cooled air to an interior of said building, and
wherein said electrically controlled air cooling unit is electrically connected to said main breaker box.

11. The system of claim 10, wherein said generator apparatus is positioned upon a telescoping slide that allows said generator apparatus to be reversibly positioned outside of said internal chamber.

12. The system of claim 10, further comprising an exhaust fan to relieve said internal chamber of heat and exhaust fumes produced during the operation of said generator apparatus.

13. The system of claim 10, further comprising a battery electrically connected to said generator apparatus.

14. The invention of claim 13, further comprising a battery charger electrically connected to said battery.

15. The system of claim 10, wherein said generator apparatus receives natural gas or liquified propane from a self contained fuel source wherein said self contained fuel source is positioned outside said cabinet apparatus.

16. The system of claim 10, further comprising a monitoring apparatus in electrical connection with the generator apparatus, which is configured to monitor the supply of power to the main breaker box from the generator apparatus, the supply of power produced from the generator apparatus, and the percentage of battery charge.

17. The system of claim 10, wherein said generator apparatus is in the internal chamber positioned below said air cooling unit.

18. The system of claim 10, further comprising an electrically controlled air heating unit positioned in the internal chamber of said cabinet apparatus, wherein said air heating unit provides heated air to the interior of said building.

19. A system incorporating a generator and an electrically controlled heating ventilation and air cooling unit into a cabinet located on an exterior of a building comprising:

a cabinet apparatus that forms at least one internal chamber, wherein said cabinet apparatus forms a barrier to environmental elements while permitting air to flow into and out of said at least one internal chamber, a generator apparatus mounted onto a telescoping mounting assembly and positioned in the at least one internal chamber of said cabinet apparatus, wherein said telescoping mounting assembly is composed of a generator mounting plate, telescoping mounting base and telescoping mounting slides, wherein said generator apparatus is configured to receive natural gas or liquified propane, wherein said generator apparatus is electrically connected to a main breaker box that supplies electrical power to said building, wherein said generator apparatus utilizes natural gas or liquified propane to produce electrical power, wherein the natural gas or liquified propane is diverted from a flow of natural gas or liquified propane that supplies a building, wherein said electrical power produced by said generator apparatus is used to power at least one electronic apparatus connected to said main breaker box, and said electrically controlled heating ventilation and air cooling unit positioned in the internal chamber of said cabinet apparatus, wherein said electrically controlled heating ventilation and air cooling unit provides air to an interior of said building, and wherein said electrically controlled heating ventilation and air cooling unit is electrically connected to said main breaker box.

* * * * *